US009346707B2

(12) United States Patent
Danielson et al.

(10) Patent No.: US 9,346,707 B2
(45) Date of Patent: May 24, 2016

(54) METHODS FOR FORMING DELAMINATION RESISTANT GLASS CONTAINERS

(71) Applicant: Corning Incorporated, Corning, NY (US)

(72) Inventors: Paul Stephen Danielson, Dundee, NY (US); Robert Anthony Schaut, Painted Post, NY (US); Sara Jean Sick, Beaver Dams, NY (US)

(73) Assignee: CORNING INCORPORATED, Corning, NY (US)

( * ) Notice: Subject to any disclaimer, the term of this patent is extended or adjusted under 35 U.S.C. 154(b) by 88 days.

(21) Appl. No.: 14/088,556

(22) Filed: Nov. 25, 2013

(65) Prior Publication Data

US 2014/0150499 A1    Jun. 5, 2014

Related U.S. Application Data

(60) Provisional application No. 61/731,767, filed on Nov. 30, 2012.

(51) Int. Cl.
*C03C 15/02* (2006.01)
*B65D 25/14* (2006.01)
(Continued)

(52) U.S. Cl.
CPC ............... *C03C 15/02* (2013.01); *B32B 17/06* (2013.01); *B65D 1/0207* (2013.01); *B65D 1/0215* (2013.01); *B65D 1/40* (2013.01); *B65D 23/02* (2013.01); *B65D 23/0814* (2013.01); *B65D 23/0821* (2013.01); *B65D 25/14* (2013.01); *B65D 25/34* (2013.01); *C03C 17/00* (2013.01); *C03C 17/005* (2013.01); *C03C 17/30* (2013.01); *C03C 17/32* (2013.01); *C03C 17/42* (2013.01);

(Continued)

(58) Field of Classification Search
None
See application file for complete search history.

(56) References Cited

U.S. PATENT DOCUMENTS 2,106,744 A    2/1938  Hood et al.
2,323,643 A    7/1943  Barton
(Continued)

FOREIGN PATENT DOCUMENTS

CN    2483332 Y    3/2002
CN    1963650 A    5/2007
(Continued)

OTHER PUBLICATIONS

Schwarzenbach et al., "Interferon α-2a interactions on Glass Vial Surfaces Measured by Atomic Force Microscopy", PDA J. Pharmaceutical Science and Technology, vol. 56, No. 2, Mar.-Apr. 2002, pp. 78-89.*

(Continued)

*Primary Examiner* — Lisa Herring
(74) *Attorney, Agent, or Firm* — Dinsmore & Shohl LLP

(57) ABSTRACT

In one embodiment, a method of forming a glass container may include forming a glass container comprising a sidewall at least partially enclosing an interior volume. At least a portion of the interior surface of the sidewall may have an interior surface layer with a persistent layer heterogeneity relative to a midpoint of the sidewall. The interior surface layer of the glass container may be removed from the interior surface of the sidewall such that a modified interior surface of the sidewall has an interior region extending from about 10 nm below the modified interior surface into a thickness of the sidewall. The interior region may have a persistent layer homogeneity relative to the midpoint of the sidewall such that the modified interior surface is resistant to delamination.

29 Claims, 7 Drawing Sheets

(51) Int. Cl.

| | | |
|---|---|---|
| *B65D 23/08* | (2006.01) | |
| *C03C 17/00* | (2006.01) | |
| *B65D 1/02* | (2006.01) | |
| *B65D 25/34* | (2006.01) | |
| *B32B 17/06* | (2006.01) | |
| *B65D 1/40* | (2006.01) | |
| *C03C 17/30* | (2006.01) | |
| *C03C 17/32* | (2006.01) | |
| *C03C 17/42* | (2006.01) | |
| *C03C 21/00* | (2006.01) | |
| *C09D 179/08* | (2006.01) | |
| *B65D 23/02* | (2006.01) | |

(52) U.S. Cl.
CPC ............ *C03C 21/002* (2013.01); *C09D 179/08* (2013.01); *C03C 2217/78* (2013.01); *C03C 2218/111* (2013.01); *Y10T 428/13* (2015.01); *Y10T 428/131* (2015.01); *Y10T 428/1317* (2015.01); *Y10T 428/315* (2015.01)

(56) References Cited

U.S. PATENT DOCUMENTS

| | | |
|---|---|---|
| 2,691,548 A | 10/1954 | Feucht et al. |
| 2,947,615 A | 8/1960 | Greene et al. |
| 3,023,139 A | 2/1962 | Tetterode |
| 3,323,889 A | 6/1967 | Carl et al. |
| 3,441,432 A | 4/1969 | Levene |
| 3,607,186 A | 9/1971 | Bognar |
| 3,674,690 A | 7/1972 | Clow et al. |
| 3,772,061 A | 11/1973 | McCoy et al. |
| 3,772,135 A | 11/1973 | Hara et al. |
| 3,779,732 A | 12/1973 | Spanoudis |
| 3,801,361 A | 4/1974 | Kitaj |
| 3,811,921 A | 5/1974 | Crawford et al. |
| 3,844,754 A | 10/1974 | Grubb et al. |
| 3,878,960 A | 4/1975 | Jonnson et al. |
| 3,900,329 A | 8/1975 | Grubb et al. |
| 3,967,995 A * | 7/1976 | Fabianic .................. 156/86 |
| 3,989,864 A | 11/1976 | Hey et al. |
| 4,021,218 A | 5/1977 | Watanabe |
| 4,030,904 A | 6/1977 | Battye et al. |
| 4,056,208 A | 11/1977 | Prejean |
| 4,056,651 A | 11/1977 | Scola |
| 4,065,317 A | 12/1977 | Baak et al. |
| 4,065,589 A | 12/1977 | Lenard et al. |
| 4,086,373 A | 4/1978 | Tobias et al. |
| 4,093,759 A | 6/1978 | Otsuki et al. |
| 4,130,677 A | 12/1978 | Huntsberger |
| 4,161,556 A | 7/1979 | Lenard et al. |
| 4,214,886 A | 7/1980 | Shay et al. |
| 4,215,165 A | 7/1980 | Gras et al. |
| 4,238,041 A | 12/1980 | Jönsson et al. |
| 4,264,658 A | 4/1981 | Tobias et al. |
| 4,280,944 A | 7/1981 | Saito et al. |
| 4,315,573 A | 2/1982 | Bradley et al. |
| 4,386,164 A | 5/1983 | Moser |
| 4,431,692 A | 2/1984 | Hofmann et al. |
| 4,595,548 A | 6/1986 | St. Clair et al. |
| 4,603,061 A | 7/1986 | St. Clair et al. |
| 4,620,985 A | 11/1986 | Goodburn et al. |
| 4,636,411 A | 1/1987 | Dubois et al. |
| 4,654,235 A | 3/1987 | Effenberger et al. |
| 4,689,085 A | 8/1987 | Plueddemann |
| 4,696,994 A | 9/1987 | Nakajima et al. |
| 4,748,228 A | 5/1988 | Shoji et al. |
| 4,749,614 A | 6/1988 | Andrews et al. |
| 4,767,414 A | 8/1988 | Williams et al. |
| 4,778,727 A | 10/1988 | Tesoro et al. |
| 4,842,889 A | 6/1989 | Hu et al. |
| 4,860,906 A | 8/1989 | Pellegrini et al. |
| 4,870,034 A | 9/1989 | Kiefer |
| 4,880,895 A | 11/1989 | Higashi et al. |
| 4,882,210 A | 11/1989 | Romberg et al. |
| 4,902,106 A | 2/1990 | Dijon et al. |
| 4,931,539 A | 6/1990 | Hayes |
| 4,961,996 A | 10/1990 | Carre et al. |
| 4,983,255 A | 1/1991 | Gruenwald et al. |
| 4,988,288 A | 1/1991 | Melgaard |
| 5,002,359 A | 3/1991 | Sayegh |
| 5,036,145 A | 7/1991 | Echterling et al. |
| 5,037,701 A | 8/1991 | Carre et al. |
| 5,049,421 A | 9/1991 | Kosh |
| 5,114,757 A | 5/1992 | Linde et al. |
| 5,120,341 A | 6/1992 | Nozawa et al. |
| 5,124,618 A | 6/1992 | Ohtaka et al. |
| 5,230,429 A | 7/1993 | Etheredge, III |
| 5,246,782 A | 9/1993 | Kennedy et al. |
| 5,251,071 A | 10/1993 | Kusukawa et al. |
| 5,252,703 A | 10/1993 | Nakajima et al. |
| 5,258,487 A | 11/1993 | Okinoshima et al. |
| 5,281,690 A | 1/1994 | Flaim et al. |
| 5,286,527 A | 2/1994 | Blum et al. |
| 5,306,537 A | 4/1994 | Gustafson et al. |
| 5,310,862 A | 5/1994 | Nomura et al. |
| 5,403,700 A | 4/1995 | Heller et al. |
| 5,476,692 A | 12/1995 | Ellis et al. |
| 5,482,768 A | 1/1996 | Kawasato et al. |
| 5,488,092 A | 1/1996 | Kausch et al. |
| 5,504,830 A | 4/1996 | Ngo et al. |
| 5,594,231 A | 1/1997 | Pellicori et al. |
| 5,601,905 A | 2/1997 | Watanabe et al. |
| 5,633,079 A | 5/1997 | Shoshi et al. |
| 5,736,476 A | 4/1998 | Watzke et al. |
| 5,756,144 A | 5/1998 | Wolff et al. |
| 5,849,369 A | 12/1998 | Ogawa |
| 5,851,200 A | 12/1998 | Higashikawa et al. |
| 5,908,542 A | 6/1999 | Lee et al. |
| 5,916,632 A | 6/1999 | Mishina et al. |
| 5,938,919 A | 8/1999 | Najafabadi |
| 6,013,333 A | 1/2000 | Carson et al. |
| 6,046,758 A | 4/2000 | Brown et al. |
| 6,048,911 A | 4/2000 | Shustack et al. |
| 6,084,034 A | 7/2000 | Miyama et al. |
| 6,096,432 A | 8/2000 | Sakaguchi et al. |
| 6,156,435 A | 12/2000 | Gleason et al. |
| 6,200,658 B1 | 3/2001 | Walther et al. |
| 6,214,429 B1 | 4/2001 | Zou et al. |
| 6,232,428 B1 | 5/2001 | Deets et al. |
| 6,277,950 B1 | 8/2001 | Yang et al. |
| 6,346,315 B1 | 2/2002 | Sawatsky |
| 6,358,519 B1 | 3/2002 | Waterman |
| 6,444,783 B1 | 9/2002 | Dodd et al. |
| 6,472,068 B1 | 10/2002 | Glass et al. |
| 6,482,509 B2 | 11/2002 | Buch-Rasmussen et al. |
| 6,537,626 B1 | 3/2003 | Spallek et al. |
| 6,561,275 B2 | 5/2003 | Glass et al. |
| 6,586,039 B2 | 7/2003 | Heinz et al. |
| 6,599,594 B1 | 7/2003 | Walther et al. |
| 6,627,377 B1 | 9/2003 | Itatani et al. |
| 6,737,105 B2 | 5/2004 | Richard |
| 6,797,396 B1 | 9/2004 | Liu et al. |
| 6,818,576 B2 | 11/2004 | Ikenishi et al. |
| 6,852,393 B2 | 2/2005 | Gandon |
| 6,866,158 B1 | 3/2005 | Sommer et al. |
| 6,921,788 B1 | 7/2005 | Izawa et al. |
| 6,939,819 B2 | 9/2005 | Usui et al. |
| 6,989,181 B2 | 1/2006 | Brandt |
| 7,087,307 B2 | 8/2006 | Nagashima et al. |
| 7,215,473 B2 | 5/2007 | Fleming |
| 7,236,296 B2 | 6/2007 | Liu et al. |
| 7,315,125 B2 | 1/2008 | Kass |
| 7,470,999 B2 | 12/2008 | Saito et al. |
| 7,569,653 B2 | 8/2009 | Landon |
| 7,619,042 B2 | 11/2009 | Poe et al. |
| 7,845,346 B2 | 12/2010 | Langford et al. |
| 7,871,554 B2 | 1/2011 | Oishi et al. |
| 7,985,188 B2 | 7/2011 | Felts et al. |
| 8,048,938 B2 | 11/2011 | Poe et al. |
| 8,053,492 B2 | 11/2011 | Poe et al. |
| 8,110,652 B2 | 2/2012 | Bito et al. |
| 8,273,801 B2 | 9/2012 | Baikerikar et al. |
| 8,302,428 B2 | 11/2012 | Borrelli et al. |

(56) References Cited

U.S. PATENT DOCUMENTS

| | | |
|---|---|---|
| 8,309,627 B2 | 11/2012 | Poe et al. |
| 8,324,304 B2 | 12/2012 | Burch et al. |
| 8,415,337 B1 | 4/2013 | Krishna |
| 8,518,545 B2 | 8/2013 | Akiba et al. |
| 2002/0037943 A1 | 3/2002 | Madsen |
| 2002/0081401 A1 | 6/2002 | Hessok et al. |
| 2002/0155216 A1 | 10/2002 | Reitz et al. |
| 2002/0182410 A1 | 12/2002 | Szum et al. |
| 2003/0072932 A1 | 4/2003 | Gandon |
| 2004/0096588 A1 | 5/2004 | Brandt |
| 2004/0199138 A1 | 10/2004 | McBay et al. |
| 2005/0048297 A1 | 3/2005 | Fukuda et al. |
| 2005/0061033 A1 | 3/2005 | Petrany et al. |
| 2005/0170722 A1 | 8/2005 | Keese |
| 2006/0099360 A1 | 5/2006 | Farha |
| 2006/0233675 A1 | 10/2006 | Stein |
| 2007/0082135 A1 | 4/2007 | Lee |
| 2007/0116907 A1 | 5/2007 | Landon |
| 2007/0157919 A1 | 7/2007 | Marandon |
| 2007/0178256 A1 | 8/2007 | Landon |
| 2007/0187280 A1 | 8/2007 | Haines et al. |
| 2007/0224427 A1 | 9/2007 | Kunita et al. |
| 2007/0225823 A1 | 9/2007 | Hawkins et al. |
| 2007/0293388 A1 | 12/2007 | Zuyev et al. |
| 2008/0069970 A1 | 3/2008 | Wu |
| 2008/0071228 A1 | 3/2008 | Wu et al. |
| 2008/0114096 A1 | 5/2008 | Qu et al. |
| 2008/0199618 A1 | 8/2008 | Wen et al. |
| 2008/0214777 A1 | 9/2008 | Poe |
| 2008/0281260 A1 | 11/2008 | William et al. |
| 2008/0292496 A1 | 11/2008 | Madsen |
| 2009/0048537 A1 | 2/2009 | Lydon et al. |
| 2009/0092759 A1 | 4/2009 | Chen et al. |
| 2009/0155506 A1 | 6/2009 | Martin et al. |
| 2009/0155570 A1 | 6/2009 | Bonnet et al. |
| 2009/0162530 A1 | 6/2009 | Nesbitt |
| 2009/0162664 A1 | 6/2009 | Ou |
| 2009/0176108 A1 | 7/2009 | Toyama et al. |
| 2009/0197088 A1 | 8/2009 | Murata |
| 2009/0197390 A1 | 8/2009 | Rothwell et al. |
| 2009/0203929 A1 | 8/2009 | Hergenrother et al. |
| 2009/0208175 A1 | 8/2009 | Hongo et al. |
| 2009/0208657 A1 | 8/2009 | Siebenlist et al. |
| 2009/0239759 A1 | 9/2009 | Balch |
| 2009/0247699 A1 | 10/2009 | Buehler et al. |
| 2009/0269597 A1 | 10/2009 | Bito et al. |
| 2009/0275462 A1 | 11/2009 | Murata |
| 2009/0297857 A1 | 12/2009 | Pascal et al. |
| 2009/0325776 A1 | 12/2009 | Murata |
| 2010/0009154 A1 | 1/2010 | Allan et al. |
| 2010/0044268 A1 | 2/2010 | Haines et al. |
| 2010/0047521 A1 | 2/2010 | Amin et al. |
| 2010/0056666 A1 | 3/2010 | Poe et al. |
| 2010/0062188 A1 | 3/2010 | Miyamoto et al. |
| 2010/0063244 A1 | 3/2010 | Poe et al. |
| 2010/0087307 A1 | 4/2010 | Murata et al. |
| 2010/0101628 A1 | 4/2010 | Poe et al. |
| 2010/0246016 A1 | 9/2010 | Carlson et al. |
| 2010/0264645 A1 | 10/2010 | Jones et al. |
| 2010/0273019 A1 | 10/2010 | Kitaike et al. |
| 2010/0297393 A1 | 11/2010 | Wu |
| 2010/0317506 A1 | 12/2010 | Fechner et al. |
| 2011/0014475 A1 | 1/2011 | Murata |
| 2011/0062619 A1 | 3/2011 | Laine et al. |
| 2011/0091732 A1 | 4/2011 | Lu et al. |
| 2011/0098172 A1 | 4/2011 | Brix |
| 2011/0159318 A1 | 6/2011 | Endo et al. |
| 2011/0165393 A1 | 7/2011 | Bayne et al. |
| 2011/0177252 A1 | 7/2011 | Kanagasabapathy et al. |
| 2011/0177987 A1 | 7/2011 | Lenting et al. |
| 2011/0186464 A1 | 8/2011 | Carta et al. |
| 2011/0189486 A1 | 8/2011 | Wendell, Jr. |
| 2011/0226658 A1 | 9/2011 | Tata-Venkata et al. |
| 2011/0274916 A1 | 11/2011 | Murata |
| 2011/0313363 A1 | 12/2011 | D'Souza et al. |
| 2012/0016076 A1 | 1/2012 | Kim et al. |
| 2012/0052293 A1 | 3/2012 | Poe et al. |
| 2012/0107174 A1 | 5/2012 | Zambaux |
| 2012/0148770 A1 | 6/2012 | Rong et al. |
| 2012/0172519 A1 | 7/2012 | Dörr et al. |
| 2012/0199203 A1 | 8/2012 | Nishizawa et al. |
| 2012/0282449 A1 | 11/2012 | Gross |
| 2013/0011650 A1 | 1/2013 | Akiba et al. |
| 2013/0071078 A1 | 3/2013 | Bennett et al. |
| 2013/0095261 A1 | 4/2013 | Ahn et al. |
| 2013/0109116 A1 | 5/2013 | Cavuoti et al. |
| 2013/0122306 A1 | 5/2013 | Bookbinder et al. |
| 2013/0171456 A1 | 7/2013 | Fadeev et al. |
| 2013/0216742 A1 | 8/2013 | DeMartino et al. |
| 2013/0224407 A1 | 8/2013 | Fadeev et al. |
| 2013/0299380 A1 | 11/2013 | Zambaux et al. |
| 2013/0327740 A1 | 12/2013 | Adib et al. |

FOREIGN PATENT DOCUMENTS

| | | |
|---|---|---|
| CN | 101479355 A | 7/2009 |
| CN | 201390409 Y | 1/2010 |
| CN | 201404453 Y | 2/2010 |
| CN | 101717189 A | 6/2010 |
| CN | 101831175 A | 9/2010 |
| CN | 201694531 U | 1/2011 |
| CN | 102066462 A | 5/2011 |
| CN | 202006114 U | 10/2011 |
| DE | 4128634 A1 | 3/1993 |
| DE | 4130414 A1 | 4/1993 |
| DE | 29702816 U1 | 4/1997 |
| DE | 102004011009 A1 | 9/2005 |
| DE | 102011085267 A1 | 5/2013 |
| EP | 176062 A2 | 4/1986 |
| EP | 515801 A1 | 12/1992 |
| EP | 1464631 A2 | 6/2004 |
| EP | 2031124 A1 | 3/2009 |
| EP | 524802 B2 | 10/2009 |
| EP | 2540682 A1 | 1/2013 |
| FR | 93015 E | 1/1969 |
| FR | 2033431 A5 | 12/1970 |
| FR | 2515633 A1 | 5/1983 |
| GB | 702292 A | 1/1954 |
| GB | 720778 A | 12/1954 |
| GB | 966731 A | 8/1964 |
| GB | 1267855 A | 3/1972 |
| GB | 1529386 A | 10/1978 |
| IN | 231117 B | 3/2009 |
| JP | 54054124 A | 4/1979 |
| JP | 56155044 A | 12/1981 |
| JP | 60254022 A | 12/1985 |
| JP | 62047623 A | 3/1987 |
| JP | 62140257 A | 6/1987 |
| JP | 1279058 A | 11/1989 |
| JP | H02153846 A | 6/1990 |
| JP | 7223845 A | 8/1995 |
| JP | 63236731 A | 10/1998 |
| JP | 11171593 A | 6/1999 |
| JP | 11314931 A | 11/1999 |
| JP | 2000007372 A | 1/2000 |
| JP | 2000219621 A | 8/2000 |
| JP | 2001033348 A | 2/2001 |
| JP | 2001180969 A | 7/2001 |
| JP | 2001192239 A | 7/2001 |
| JP | 2001229526 A | 8/2001 |
| JP | 2001236634 A | 8/2001 |
| JP | 2002003241 A | 1/2002 |
| JP | 2002249340 A | 9/2002 |
| JP | 2006291049 A | 10/2006 |
| JP | 2008195602 A | 8/2008 |
| JP | 2009108181 A | 5/2009 |
| JP | 2009207618 A | 9/2009 |
| JP | 2010059038 A | 3/2010 |
| KR | 1006303090000 | 9/2006 |
| RO | 83460 A2 | 3/1984 |
| SU | 990700 A | 1/1983 |
| WO | 9005031 A1 | 5/1990 |
| WO | 9510487 A1 | 4/1995 |
| WO | 9725932 A1 | 7/1997 |

(56) References Cited

FOREIGN PATENT DOCUMENTS

| | | |
|---|---|---|
| WO | 0117569 A2 | 3/2001 |
| WO | 2007016516 A2 | 2/2007 |
| WO | 2008050500 A1 | 5/2008 |
| WO | 2009002660 A2 | 12/2008 |
| WO | 2009095569 A1 | 8/2009 |
| WO | 2011069338 A1 | 6/2011 |
| WO | 2011073106 A1 | 6/2011 |
| WO | 2011080543 A1 | 7/2011 |
| WO | 2011103798 A1 | 9/2011 |
| WO | 2011145661 A1 | 11/2011 |
| WO | 2012026290 A1 | 3/2012 |
| WO | 2013063290 A1 | 5/2013 |
| WO | 2013130724 A2 | 9/2013 |
| WO | 2014005030 A1 | 1/2014 |
| ZA | 9706079 A | 3/1998 |

OTHER PUBLICATIONS

Shelby, "Introduction to Glass Science and Technology", Royal Society of Chemistry, Jan. 1, 2005—Technology & Engineering, p. 193.*
Non-Final Office Action dated Sep. 9, 2014 relating to U.S. Appl. No. 14/057,697, filed Oct. 18, 2013. pp. 1-15.
U.S. Pharmacopeial Convention Medicines Compendium, "<660> Containers-Glass" [online], (2014). Retrieved from the Internet: <URL: https://mc.usp.org/general-chapters>. pp. 1-5.
European Pharmacopeia, 5th edition, 3.2 Containers, [online]. Retrieved from the Internet: <URL: http://pharmacyebooks.com/2009/09/european-pharmacopoeia-5-0-online.html>. pp. 1-4.
Ciullo, P.A., Industrial Minerals and Their Uses—A Handbook and Formulary. William Andrew Publishing/Noyes, (1996). ISBN: 0-8155-1408-5. Online version available at: <URL: http://app.knovel.com/hotlink/toc/id:kplMTUAHFB/industrial-minerals-their/industrial-minerals-their>. pp. 1-7.
Final Office Action dated Jul. 16, 2014 relating to U.S. Appl. No. 14/052,048, filed Oct. 11, 2013. pp. 1-9.
Plueddemann, Edwin, "Silane Coupling Agents," Springer Science+Business Media, LLC (1982). ISBN: 978-1-4899-0344-0. pp. 1-18.
Non-Final Office Action dated Nov. 14, 2014 relating to U.S. Appl. No. 14/075,605, filed Nov. 8, 2013. pp. 1-9.
Notice of Allowance dated Jan. 7, 2015 relating to U.S. Appl. No. 14/052,048, filed Oct. 11, 2013. pp. 1-10.
Non-Final Office Action dated Jan. 29, 2015 relating to U.S. Appl. No. 13/780,740, filed Feb. 28, 2013. pp. 1-79.
Hawley's Condensed Chemical Dictionary Melting Points, 2007. pp. 1-5.
Non-Final Office Action dated Mar. 4, 2015 relating to U.S. Appl. No. 14/057,697, filed Oct. 18, 2013. pp. 1-12.
Final Office Action dated May 6, 2015 relating to U.S. Appl. No. 13/780,740, filed Feb. 28, 2013. pp. 1-36.
English Machine Translation of CN 101831175 A; pp. 1-13.
Pappalardo, L. T., "DSC Evaluation of Epoxy and Polyimide-Impregnated Laminates (Prepregs)"; Journal of Applied Polymer Science, vol. 21, 809-820, John Wiley & Sons, Inc. (1977).
Keramid and Kerimide 601, Scifinder American Chemical Society (ACS) (2015); pp. 1-5.
Polyimide—Hawley's Condensed Chemical Dictionary—Wiley Online (2007); 1 Page.
Tyzor (Du Pont)—Hawley's Condensed Chemical Dictionary—Wiley Online (2007). 1 Page.
McKeen, L., "Fatigue and Tribological Properties of Plastics and Elastomers," 2d Ed 7 Polyimides, (2010); 25 Pages.
"DuPont Teflon PFA TE-7224 Aqueous Fluoropolymers made with Echelon Dispersion Technology" [online]. Dupont, 2006. Retrieved from the Internet: <URL: http://www2.dupont.com/Teflon_Industrial/en_US/assets/downloads/k15758.pdf>.
"Spectroscopic Ellipsometry Methods for Thin Absorbing Coatings", by Hilfiker et al. from Society of Vacuum Coaters 505/856-7188, pp. 511-516, 51st Annual Technical Conference Proceedings, Chicago, IL, Apr. 19-24, (2008).

"Thermal Stability of the Silica-Aminopropylsilane-Polyimide Interface", Linde, et al. Journal of Polymer Science, Polymer Chemistry Edition, vol. 22, 3043-3062, John Wiley & Sons, Inc. (1984).
Anderson, et al., "Polyimide-Substrate Bonding Studies Using γ-APS Coupling Agent", IEEE Transactions on Components, Hybrids, and Manufacturing Technology, vol. CHMT-9, No. 4, p. 364-369, Dec. 1986.
Benitez, et al., "SiOx-SiNx functional coatings by PECVD of organosilicon monomers other than silane", Annual Technical Conference Proceedings—Society of Vacuum Coaters (2002), 45th, 280-285; ISSN: 0731-1699.
Cho, et al. "Adhesion behavior of PDMS-containing polyimide to glass", Journal of Adhesion Science and Technology 12:3, pp. 253-269, Taylor & Francis (1998), DOI: 10.1163/156856198X00867.
De Rosa, et al., "Scratch Resistant Polyimide Coatings for Aluminosilicate Glass Surfaces", The Journal of Adhesion, 78: 113-127, Taylor & Francis (2002), ISSN: 0021-8464.
Dow Corning, "A Guide to Silane Solutions: Fiberglass and Composites", Silicones Simplified [online]. Dow Corning Corporation, 2009. Retrieved from the Internet: <URL: https://www.xiameter.com/en/ExploreSilicones/Documents/95-728-01%20Fiberglass%20and%20Composites.pdf>.
Dow Corning, Resins and Intermediates Selection Guide; Paints & Inks Solutions, p. 1-8, 2010.
Ennis, et al., "Glass Vials for Small Volume Parenterals: Influence of drug and manufacturing process on glass delamination," Pharmaceutical Development and Technology, 6(3): p. 393-405, (2001).
Francen, et al., "Fluorochemical glass treatments", The Glass Industry (1965), 46(10), 594-7; 628-9; ISSN: 0017-1026.
G. L. Witucki, "A Silane Primer: Chemistry and Applications of Alkoxy Silanes", Journal of Coatings Technology, (vol. 65) pp. 57-60, Federation of Societies for Coatings Technology, Blue Bell, Pennsylvania (Jul. 1993).
Gelest, Inc., MSDS, Material Safety Data Sheet, Aminopropylsilsesquioxane Oligomer, 22-25%—WSA-9911 [online]. Gelest, Inc. Morrisville, PA, 2008. Retrieved from the Internet: <URL: http://shop.gelest.com/Product.aspx?catnum=WSA-9911&Index=0&TotalCount=1>.
Guadagnino, et al., "Delamination Propensity of Pharmaceutical Glass Containers by Accelerated Testing with Different Extraction Media," PDA Journal of Pharmaceutical Science and Technology, Mar./Apr. 2012, vol. 66, No. 2, 116-125. DOI: 10.5731/pdajpst.2012.00853.
Iacocca, et al., "Corrosive attack of glass by a pharmaceutical compound," Journal of Materials Science, 42:801-811, Springer Science+Business Media, LLC (2007), DOI: 10.1007/s10853-006-0156-y.
Iacocca, et al., "Factors Affecting the Chemical Durability of Glass Used in the Pharmaceutical Industry", AAPS PharmSciTech, vol. 11, No. 3, pp. 1340-1349, Sep. 2010.
Jiang, et al., "Novel Mechanism of Glass Delamination in Type 1A Borosilicate Vials Containing Frozen Protein Formulations", PDA Journal of Pharmaceutical Science and Technology, Jul. / Aug. 2013, vol. 67, No. 4, 323-335.
Jin, et al., "Preparation and characterization of poly(phthalazinone ether ketone)/SiO2 hybrid composite thin films with low friction coefficient", Journal of Sol-Gel Science and Technology, Springer Science+Business Media, LLC (2008), 46(2), 208-216; ISSN: 0928-0707.
Jin, et al., "Preparation and investigation of the tribological behavior of poly(phthalazinone ether keytone)/silica thin films", Chinese Journal of Materials Research. vol. 22, No. 1, pp. 26-30. Feb. 25, 2008. ISSN: 1005-3093. Published by: Chinese Academy of Sciences, No. 1, Beijing, China.
Metwalli et al., Journal of Colloid and Interface Science 298 (2006) 825-831.
Poe, et al., "Zero CTE polyimides for athermal optical membranes", Proceedings of SPIE, vol. 7061, Issue: Novel Optical Systems Design and Optimization XI, pp. 706114/1-706114/9, Journal, 2008, Publisher: Society of Photo-Optical Instrumentation Engineers, ISSN: 0277-786X.

(56) References Cited

OTHER PUBLICATIONS

Rupertus, V., "PDA Europe Thanks Universe of Pre-Filled Syringes: Two ways to minimize the delamination risk of glass containers," P&M—EU; PDA Letter, p. 42-23, Jan. 2012.
Schmid, et al., "Recommendations on Delamination Risk Mitigation & Prediction for Type I Pharmaceutical Containers Made of Tubing Glass", Nuova Ompi: Glass Division, p. 40-42, Frederick Furness Publishing (2012).
Schmid, et al., "Glass Delamination: Facts—Prevention—Recommendations", Stevanato Group Market Update, News Issue 5, May 2011, p. 1-4.
Schott North America, Inc., "Schott Type 1 plus: SiO2 coating resists delamination" [online], Schott North America, Inc., retrieved from the internet: <URL: http://www.us.schott.com/pharmaceutical_packaging/english/download/flyer_type_i_plus_us.pdf>.
Schwarzenbach, et al., "Topological Structure and Chemical Composition of Inner Surfaces of Borosilicate Vials," PDA Journal of Pharmaceutical Science and Technology, May / Jun. 2004, vol. 58, No. 3, 169-175.
Sloey, et al., "Determining the Delamination Propensity of Pharmaceutical Glass Vials Using a Direct Stress Method," PDA Journal of Pharmaceutical Science and Technology, Jan. / Feb. 2013, vol. 67, No. 1, 35-42. DOI: 10.5731/pdajpst.2013.00900.
Smay, G. L., "The characteristics of high-temperature resistant organic polymers and the feasibility of their use as glass coating materials", Journal of Materials Science, 20 (4), pp. 1494-1500, Chapman & Hall Ind. (1985), ISSN: 0022-2461.
U.S. Department of Health & Human Services, "Advisory to Drug Manufactures: Formation of Glass Lamellae in Certain Injectable Drugs" [online] U.S. Food & Drug Administration, Mar. 25, 2011, retrieved from the internet: <URL: http://www.fda.gov/Drugs/DrugSafety/ucm248490.htm>.
Wagner, C., "PDA/FDA Glass Quality Conference: an alternative glass packing solution to reduce delamination risks," [PowerPoint Presentation] PDA/FDA Glass Quality Conference, Washington, D.C., Jun. 4-5, (2012).
Wahab, et al., "Silica- and Silsesquioxane-Containing Polymer Nanohybrids", Macromolecules Containing Metal and Metal-Like Elements, vol. 4: Group IVA Polymers, Chapter 6, 2005 John Wiley & Sons, Inc.
Walther, et al., "Pharmaceutical Vials with Extremely High Chemical Inertness" [online], PDA Journal of Pharmaceutical Science and Technology, May / Jun. 2002, vol. 56, No. 3, 124-129 (abstract); retrieved from the internet: <URL: http://journal.pda.org/content/56/3/124.abstract>.
Non-Final Office Action dated Jul. 30, 2013 relating to U.S. Appl. No. 13/780,740, filed Feb. 28, 2013.
International Search Report and Written Opinion mailed Oct. 2, 2013, relating to International Patent Application No. PCT/US2013/044686 filed Jun. 7, 2013.
International Search Report & Written Opinion mailed Oct. 28, 2013 for International Patent Application No. PCT/US2013/028187 filed Feb. 28, 2013.
Huang, et al., "Cubic silsesquioxane-polyimide nanocomposites with improved thermomechanical and dielectric properties", Acta Materialia, Elsevier, vol. 53, No. 8, pp. 2395-2404, May 1, 2005; ISSN: 1359-6454.
International Search Report & Written Opinion mailed Oct. 28, 2013 for International Patent Application No. PCT/US2013/048589 filed Jun. 28, 2013.
Final Office Action dated Jan. 28, 2014 relating to U.S. Appl. No. 13/780,740, filed Feb. 28, 2013.
International Search Report & Written Opinion mailed Jan. 16, 2014 for International Patent Application No. PCT/US2013/066370 filed Oct. 23, 2013.
Pantano, Carlo G.,"The Role of Coatings and Other Surface Treatments in the Strength of Glass", [online], Department of Materials Science and Engineering Materials Research Institute, The Pennsylvania State University, University Park, PA. 2009. Retrieved from the Internet: <URL: http://www.gmic.org/Strength%20In%20Glass/Pantano%20Pac%20Rim.pdf>. pp. 1-55.
Non-Final Office Action dated Mar. 10, 2014 relating to U.S. Appl. No. 14/052,048, filed Oct. 11, 2013.
ASTM, "Standard Specification for Glasses in Laboratory Apparatus," Designation E438-92 (Reapproved 2006). Retrieved from the Internet: <URL: http://enterprise2.astm.org/DOWNLOAD/E438-92R06.1656713-1.pdf>. p. 1.
International Search Report & Written Opinion mailed Feb. 26, 2014 for International Patent Application No. PCT/US2013/071437 filed Nov. 22, 2013.
International Search Report & Written Opinion mailed Feb. 26, 2014 for International Patent Application No. PCT/US2013/071447 filed Nov. 22, 2013.
International Search Report & Written Opinion mailed Feb. 26, 2014 for International Patent Application No. PCT/US2013/071460 filed Nov. 22, 2013.
International Search Report & Written Opinion mailed Feb. 26, 2014 for International Patent Application No. PCT/US2013/071473 filed Nov. 22, 2013.
Non-Final Office Action dated Mar. 20, 2014 relating to U.S. Appl. No. 14/057,697, filed Oct. 18, 2013. pp. 1-14.
International Search Report & Written Opinion mailed May 6, 2014 for International Patent Application No. PCT/US2013/071776 filed Nov. 26, 2013.
U. Watjen, et al. "The Certification of a Reference Material for the Determination of the Alkali Leaching From Pharmaceutical Glass Containers IRMM-435", May 4, 2007, XP055114934, Retrieved from the Internet: URL: http://www.irmm.jrc.be/html/reference_materials_catalogue/catalogue/attachments/IRMM-435_report.pdf.
Non-Final Office Action dated Aug. 13, 2014 relating to U.S. Appl. No. 13/780,740, filed Feb. 28, 2013. pp. 1-43.
Non-Final Office Action dated Oct. 6, 2015 relating to U.S. Appl. No. 13/780,754, filed Feb. 28, 2013; pp. 1-24.
Non-Final Office Action dated Oct. 6, 2015 relating to U.S. Appl. No. 14/812,898, filed Jul. 29, 2015; pp. 1-22.
Non-Final Office Action dated Dec. 16, 2015 for U.S. Appl. No. 14/812,902, filed Jul. 29, 2015. pp. 1-25.
International Search Report and Written Opinion mailed Nov. 20, 2015 for PCT/US2015/048592 filed Sep. 4, 2015. pp. 1-11.
Final Office Action dated Jun. 3, 2015 relating to U.S. Appl. No. 14/075,605, filed Nov. 8, 2013. pp. 1-12.
Notice of Allowance dated Jun. 26, 2015 relating to U.S. Appl. No. 14/057,697, filed Oct. 18, 2013. pp. 1-9.
International Search Report & Written Opinion mailed Feb. 2, 2016 for PCT/US2015/062169 filed Nov. 23, 2015. pp 1-13.
Singapore Written Opinion dated Feb. 23, 2016 for SG Patent Application No. 11201504070P. pp. 1-9.
Non-Final Office Action dated Mar. 9, 2016 for U.S. Appl. No. 13/912,457, filed Jun. 7, 2013. pp. 1-31.
Non-Final Office Action mailed Mar. 23, 2016 for U.S. Appl. No. 13/827,732, filed Mar. 14, 2013. pp. 1-28.
Yashchishin, et al., "Homogeneity and lamination of sheet glass," L'vov Mechanized Glass Works, Translated from Steklo i Keramika, No. 4, Apr. 1978, p. 192-194.
Cerdan-Diaz, et al., "Improving chemical durability and resistance to corrosion/delamination through chemistry enhancement in glass manufacturing," Glass Delamination Scientific Symposium, May 25, 2011, Arlington, VA, p. 1-29.

\* cited by examiner

METHODS FOR FORMING DELAMINATION RESISTANT GLASS CONTAINERS

CROSS REFERENCE TO RELATED APPLICATIONS

The present specification claims priority to U.S. Provisional Patent Application Ser. No. 61/731,767 filed Nov. 30, 2012 and entitled "Glass Containers With Improved Attributes," the entirety of which is incorporated by reference herein.

BACKGROUND

1. Field

The present specification generally relates to methods for forming glass containers and, more specifically, to methods of forming glass containers such that the glass containers are resistant to delamination.

2. Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as to not affect the stability of the pharmaceutical compositions contained therein. Glasses having suitable chemical durability include those glass compositions within the ASTM standard E438.92 'Type IA' and 'Type IB' glass compositions which have a proven history of chemical durability. In general terms, chemically durable glasses are glasses whose constituent components do not dissolve from the glass when the glass is exposed to a solution for extended periods of time.

Although Type IA and Type IB glass compositions are commonly used in pharmaceutical packages due to their chemical durability, they do suffer from several deficiencies, including a tendency for the interior surfaces of the pharmaceutical package to shed glass particulates or "delaminate" following exposure to pharmaceutical solutions.

Accordingly, a need exists for alternative glass containers which exhibit a reduced propensity to delaminate.

SUMMARY

According to one embodiment, a method of forming a glass container may include forming a glass container comprising a sidewall at least partially enclosing an interior volume. At least a portion of the interior surface of the sidewall may have an interior surface layer with a persistent layer heterogeneity relative to a midpoint of the sidewall. The interior surface layer of the glass container may be removed from the interior surface of the sidewall such that a modified interior surface of the sidewall has an interior region extending from about 10 nm below the modified interior surface into a thickness of the sidewall. The interior region may have a persistent layer homogeneity relative to the midpoint of the sidewall such that the modified interior surface is resistant to delamination.

In another embodiment, a method for forming a glass container may include forming a glass container comprising a sidewall at least partially enclosing an interior volume. At least a portion of the interior surface of the sidewall may have an interior surface layer with a persistent layer heterogeneity relative to a midpoint of the sidewall. The interior surface of the sidewall is etched to remove the interior surface layer such that a modified interior surface of the sidewall has an interior region extending from about 10 nm below the modified interior surface into a thickness of the sidewall. The interior region may have a persistent layer homogeneity relative to the midpoint of the sidewall such that the modified interior surface is resistant to delamination.

In another embodiment, a method of forming a glass container includes forming a glass container comprising a sidewall at least partially enclosing an interior volume such that at least a portion of an interior surface of the sidewall has an interior surface layer. An extrema in a layer concentration of each constituent component in the interior surface layer is less than about 80% or greater than about 120% of a bulk concentration of a same constituent component at a midpoint of the sidewall when the glass container is in an as-formed condition. The interior surface layer is removed from the interior surface of the sidewall such that a modified interior surface of the sidewall has an interior region extending into a thickness of the sidewall. An extrema in a layer concentration of each constituent component in the interior region is greater than or equal to about 92% and less than or equal to about 108% of a bulk concentration of a same constituent component at a midpoint of the thickness of the sidewall after the interior surface layer has been removed.

Additional features and advantages of the glass container described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
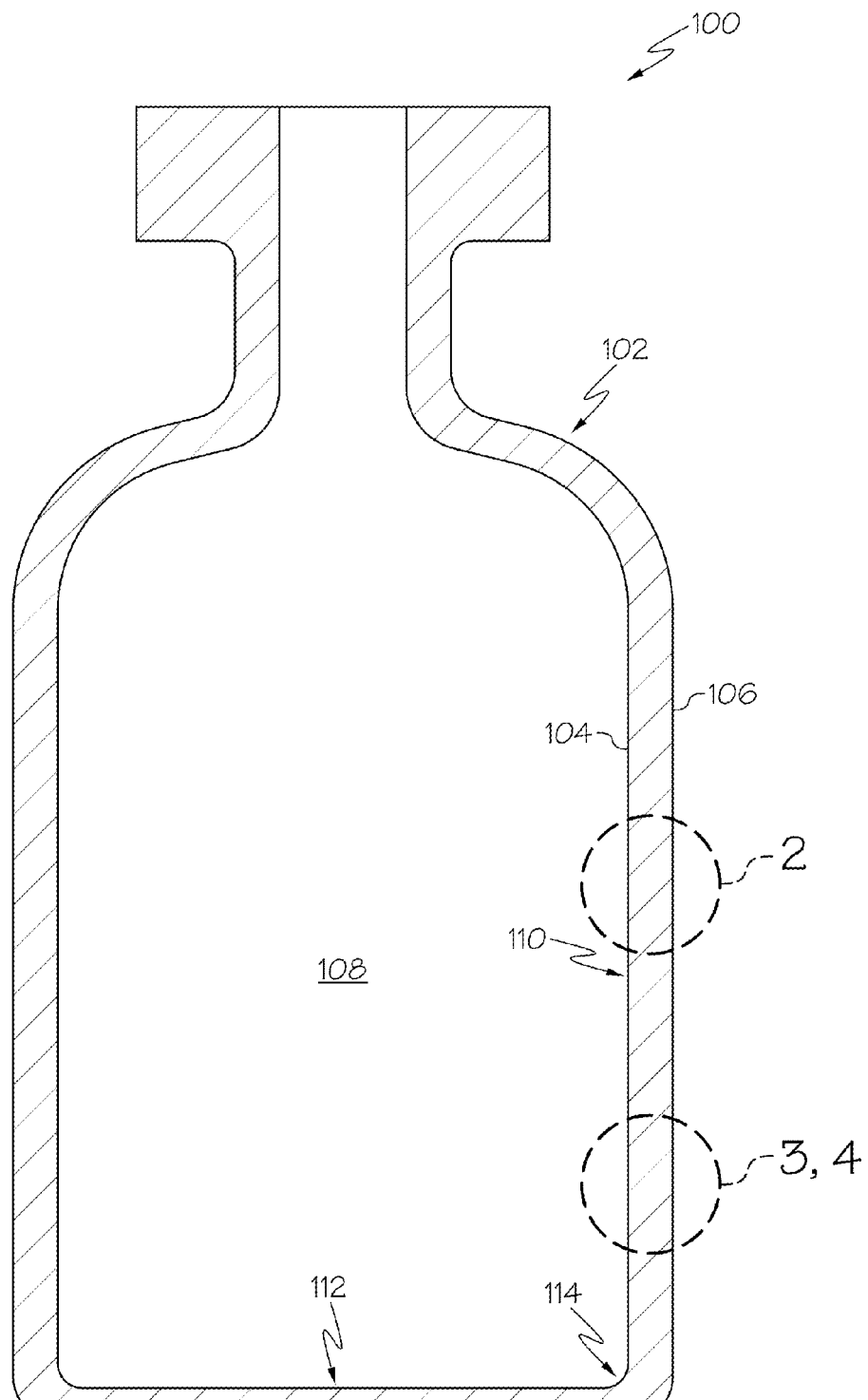
FIG. 1 schematically depicts a cross section of a glass container, specifically a glass vial, according to one or more embodiments described herein.

Reference will now be made in detail to various embodiments of methods of forming glass containers which have improved resistance to delamination, examples of which are illustrated in the accompanying drawings. Whenever possible, the same reference numerals will be used throughout the drawings to refer to the same or like parts. In one embodiment, a method of forming a glass container may include forming a glass container comprising a sidewall at least partially enclosing an interior volume. At least a portion of the interior surface of the sidewall may have an interior surface layer with a persistent layer heterogeneity relative to a midpoint of the sidewall. The interior surface layer of the glass container may be removed from the interior surface of the sidewall such that a modified interior surface of the sidewall has an interior region extending from about 10 nm below the modified interior surface into a thickness of the sidewall. The interior region may have a persistent layer homogeneity relative to the midpoint of the sidewall such that the modified interior surface is resistant to delamination. The methods of forming glass containers which are resistant to delamination and the properties of the glass containers will be described in more detail herein with specific reference to the appended drawings.

The term "chemical durability," as used herein, refers to the ability of the glass composition to resist degradation upon exposure to specified chemical conditions. Specifically, the chemical durability of the glass compositions described herein was assessed according to 3 established material testing standards: DIN 12116 dated Mar. 2001 and entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; ISO 720:1985 entitled "Glass—Hydrolytic resistance of glass grains at 121 degrees C.—Method of test and classification"; and ISO 719:1985 "Glass—Hydrolytic resistance of glass grains at 98 degrees C.—Method of test and classification." Each standard and the classifications within each standard are described in further detail herein. Alternatively, the chemical durability of a glass composition may be assessed according to USP <660> entitled "Surface Glass Test," and/or European Pharmacopeia 3.2.1 entitled "Glass Containers For Pharmaceutical Use" which assess the durability of the surface of the glass.

Conventional glass containers or glass packages for containing pharmaceutical compositions are generally formed from glass compositions which are known to exhibit chemical durability and low thermal expansion, such as Type IB alkali borosilicate glasses. While alkali borosilicate glasses exhibit good chemical durability, container manufacturers have observed silica-rich glass flakes dispersed in the solution contained in the glass containers. This phenomena is referred to as delamination. Delamination occurs particularly when the solution has been stored in direct contact with the glass surface for long time periods (months to years). Accordingly, a glass which exhibits good chemical durability may not necessarily be resistant to delamination.

Delamination refers to a phenomenon in which glass particles are released from the surface of the glass following a series of leaching, corrosion, and/or weathering reactions. In general, the glass particles are silica-rich flakes of glass which originate from the interior surface of the package as a result of the leaching of modifier ions into a solution contained within the package. These flakes may generally be from about 1 nm to about 2 μm thick with a width greater than about 50 μm. As these flakes are primarily composed of silica, the flakes generally do not further degrade after being released from the surface of the glass.

It has heretofore been hypothesized that delamination is due to the phase separation which occurs in alkali borosilicate glasses when the glass is exposed to the elevated temperatures used for reforming the glass into a container shape.

However, it is now believed that the delamination of the silica-rich glass flakes from the interior surfaces of the glass containers is due to the compositional characteristics of the glass container in its as-formed condition. Specifically, the high silica content of alkali borosilicate glasses causes the glass to have relatively high melting and forming temperatures. However, the alkali and borate components in the glass composition melt and/or vaporize at much lower temperatures. In particular, the borate species in the glass are highly volatile and evaporate from the surface of the glass at the high temperatures necessary to form and reform the glass.

Specifically, glass stock, such as a glass tube or the like, is reformed into glass containers at high temperatures and in direct flames. The high temperatures needed at higher equipment speeds cause the more volatile borate species to evaporate from portions of the surface of the glass. When this evaporation occurs within the interior volume of the glass container, the volatilized borate species are re-deposited in other areas of the glass container surface causing compositional heterogeneities in the glass container surface, particularly with respect to the near-surface regions of the interior of the glass container (i.e., those regions at or directly adjacent to the interior surfaces of the glass container).

Referring to FIG. 1 by way of example, a glass container, such as a glass container for storing a pharmaceutical composition, is schematically depicted in cross section. The glass container 100 generally comprises a glass article with a glass body 102. The glass body 102 extends between an interior surface 104 and an exterior surface 106 and generally encloses an interior volume 108. In the embodiment of the glass container 100 shown in FIG. 1, the glass body 102 generally comprises a wall portion 110 and a floor portion 112. The wall portions 110 and the floor portion 112 may generally have a thickness in a range from about 0.5 mm to about 3.0 mm. The wall portion 110 transitions into the floor portion 112 through a heel portion 114. The interior surface 104 and floor portion 112 are uncoated (i.e., they do not contain any inorganic coatings or organic coatings and, as such, the contents stored in the interior volume 108 of the glass container 100 are in direct contact with the glass from which the glass container 100 is formed. While the glass container 100 is depicted in FIG. 1 as having a specific shape form (i.e., a vial), it should be understood that the glass container 100 may have other shape forms, including, without limitation, vacutainers, cartridges, syringes, syringe barrels, ampoules, bottles, flasks, phials, tubes, beakers, or the like.

As noted herein, the glass container 100 may be formed by converting a glass tube into the container shape. For example, as one end of a glass tube is heated to close the glass tube and form the bottom or floor portion 112 of the container 100, more highly volatile species, such as borate species and/or alkali species or the like, may evaporate from the bottom portion of the tube and be re-deposited elsewhere in the tube. The evaporation of material from the heel and floor portions of the container is particularly pronounced as these areas of the container undergo the most extensive re-formation and, as such, are exposed to the highest temperatures. As a result, the areas of the container exposed to higher temperatures, such as the floor portion 112, may have silica-rich surfaces. Other areas of the interior surface 104 of the container which are amenable to deposition of the volatilized species, such as the wall portion 110, may have an interior surface layer 105 (schematically depicted in FIG. 2) formed by the condensation of the volatilized species and, as such, the surface is silica-poor. For example, in the case of borate species, areas amenable to boron deposition which are at a temperature greater than the anneal point of the glass composition but less than the hottest temperature the glass is subjected to during reformation can lead to boron incorporation on the surface of the glass.

Figure 2:
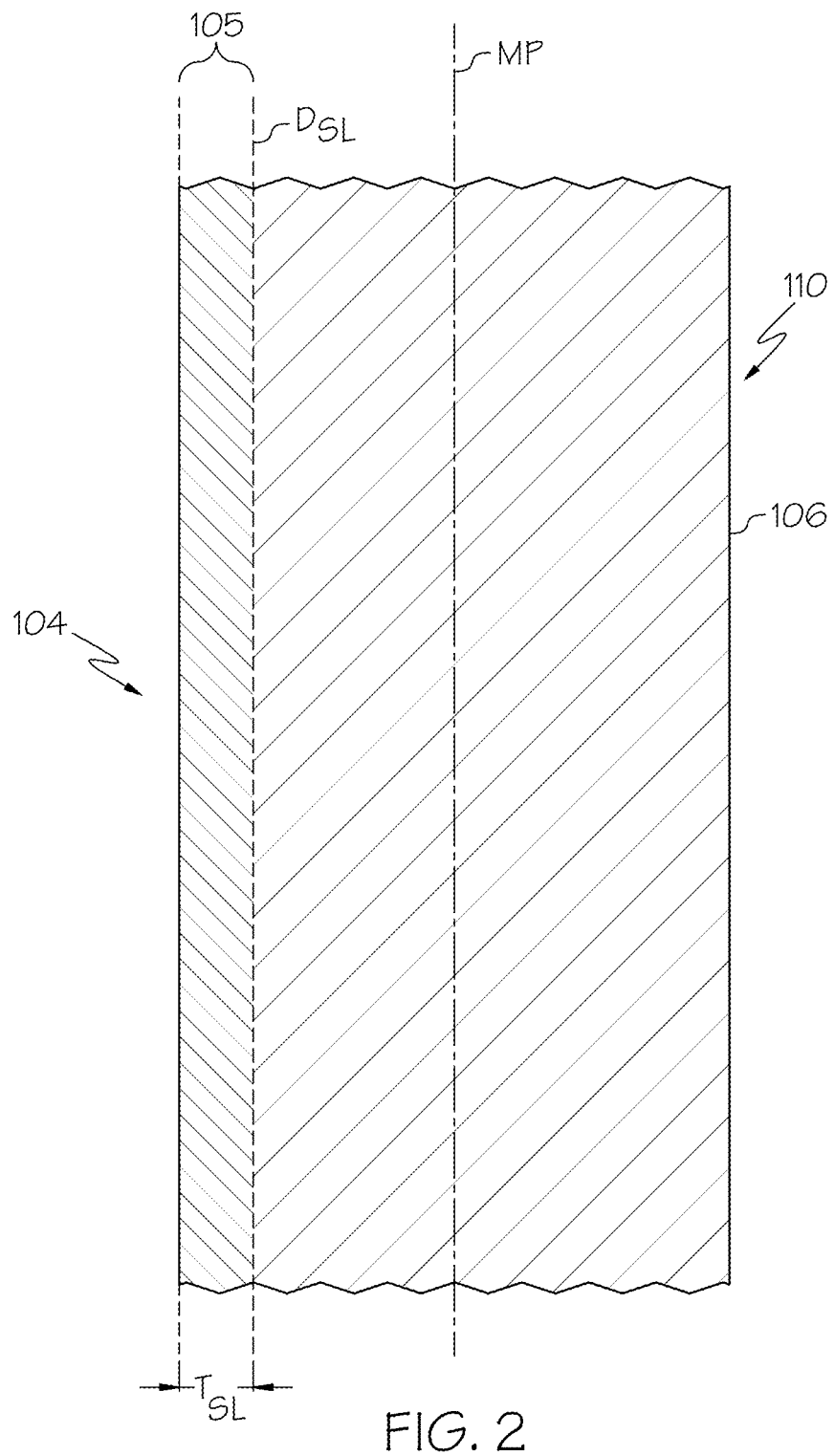
FIG. 2 schematically depicts a portion of the sidewall of the glass container of FIG. 1 prior to removal of the interior surface layer with persistent layer heterogeneity.

Referring now to FIGS. 1 and 2, FIG. 2 schematically depicts the interior surface 104 of a portion of a glass container 100, including the interior surface layer 105 which includes deposited volatilized species. The composition of the interior surface layer 105 is different than the composition of the glass deeper in the wall portion, such as at the midpoint MP of the wall portion 110. Specifically, FIG. 2 schematically depicts a partial cross section of a wall portion 110 of the glass container 100 of FIG. 1. The glass body 102 of the glass container 100 includes an interior surface layer 105 which extends from the interior surface 104 of the glass container 100 into the thickness of the wall portion 110 to a depth $D_{SL}$ from the interior surface 104 of the glass container. The glass composition within the interior surface layer 105 has a persistent layer heterogeneity relative to the glass at the midpoint MP of the wall portion and, as such, it should be understood that the composition of the glass in the interior surface layer 105 is different than the glass at the midpoint MP of the wall portion 110. In some embodiments, the thickness $T_{SL}$ of the interior surface layer is at least about 30 nm. In some embodiments, the thickness $T_{SL}$ of the interior surface layer is at least about 50 nm. In some embodiments, the thickness $T_{SL}$ of the interior surface layer is at least about 100 nm. In some embodiments, the thickness $T_{SL}$ of the interior surface layer is at least about 150 nm. In some other embodiments, the thickness $T_{SL}$ of the interior surface layer is at least about 200 nm or even about 250 nm. In some other embodiments, the thickness $T_{SL}$ of the interior surface layer is at least about 300 nm or even about 350 nm. In yet other embodiments, the thickness $T_{SL}$ of the interior surface layer is at least about 500 nm. In some embodiments, the interior surface layer may extend to a thickness $T_{SL}$ of at least about 1 μm or even at least about 2 μm.

In the embodiments described herein, the phrase "persistent layer heterogeneity" means that the concentration of the constituent components (e.g., $SiO_2$, $Al_2O_3$, $Na_2O$, etc.) of the glass composition in the interior surface layer 105 vary from the concentration of the same constituent components at the midpoint of a thickness of the glass body (i.e., at a point along the midpoint line MP which evenly bisects the glass body between the interior surface 104 and the exterior surface 106) by an amount which would result in delamination of the glass body upon long term exposure to a solution contained within the glass container. In the embodiments described herein, the persistent layer heterogeneity in the interior surface layer of the glass body is such that an extrema (i.e., the minimum or maximum) of a layer concentration of each of the constituent components of the glass composition in the interior surface layer 105 is less than about 92% or greater than about 108% of the same constituent component at a midpoint of a thickness of the glass body when the glass container 100 is in as-formed condition. In other embodiments, the persistent layer heterogeneity in the interior surface layer 105 of the glass body is such that the extrema of the layer concentration of each of the constituent components of the glass composition in the interior surface layer 105 is less than about 90% or greater than about 110% of the same constituent component at the midpoint of the thickness of the glass body when the glass container 100 is in as-formed condition. In still other embodiments, the persistent layer heterogeneity in the interior surface layer 105 of the glass body is such that the extrema of the layer concentration of each of the constituent components of the glass composition in the interior surface layer 105 is less than about 80% or greater than about 120% of the same constituent component at the midpoint of the thickness of the glass body when the glass container 100 is in as-formed condition. In some embodiments, the persistent layer heterogeneity is exclusive of constituent components of the glass composition which are present in an amount less than about 2 mol. %. The persistent layer heterogeneity is also exclusive of any water which may be present in the glass composition.

The term "as-formed condition," as used herein, refers to the composition of the glass container 100 after the glass container has been formed from glass stock but prior to the container being exposed to any additional processing steps, such as ion-exchange strengthening, coating, ammonium sulfate treatment, acid etching, and/or any other surface modifications. In the embodiments described herein, the layer concentration of the constituent components in the glass composition is determined by collecting a composition sample through the thickness of the glass body in the area of interest using dynamic secondary ion mass spectroscopy ("D-sims"). In the embodiments described herein, the composition profile is sampled from areas of the interior surface 104 of the glass body 102. The sampled areas have a maximum area of 1 mm². This technique yields a compositional profile of the species in the glass as a function of depth from the interior surface of the glass body for the sampled area.

When the glass container is formed from a borosilicate glass composition (such as a Type IB glass composition), the presence of the interior surface layer 105 containing deposited volatile species may also be ascertained qualitatively. Specifically, the glass container 100 may be filled with a solution of methylene blue dye. The methylene blue dye reacts with and chemically bonds to the boron-rich regions of the glass surface, visibly staining the areas blue. A suitable methylene blue dye solution may include, without limitation, a 1% solution of methylene blue in water.

If this interior surface layer 105 of deposited volatilized species remains on the interior surface 104, solutions contained in the container may leach the deposited volatilized species from the interior surface layer 105. As these volatilized species are leached from the glass, a high silica glass network (gel) remains on the interior surface 104 which swells and strains during hydration and eventually spalls from the surface (i.e., the interior surface 104 of the glass container 100 delaminates), potentially introducing particulate matter into the solution contained within the glass container.

One conventional solution to delamination is to coat the interior surface of the body of the glass container with an inorganic coating, such as $SiO_2$. This coating may have a thickness from about 100 nm to 200 nm and prevents the contents of the container from contacting the interior surface of the body and causing delamination. However, the application of such coatings may be difficult and require additional manufacturing and/or inspection steps, thereby increasing the overall cost of container manufacture. Further, if the contents of the container penetrate the coating and contact the interior surface of the body, such as through a discontinuity in the coating, the resultant delamination of the glass body may cause portions of the coating to detach from the interior surface of the body.

In the embodiments described herein, the propensity of the glass containers to delaminate is mitigated by removing the interior surface layer 105 from the glass container such that the modified interior surface (i.e., the interior surface of the glass container after removal of the interior surface layer) has a more homogenous composition relative to the midpoint MP of the wall portion 110 of the glass container. The glass container 100 exhibits an improved resistance to delamination after the interior surface layer 105 is removed.

In some embodiments, the interior surface layer 105 is removed from the wall portion 110 of the glass container by etching. For example, an etchant may be introduced into the interior volume 108 and allowed to remain in the interior volume for a time sufficient to remove the interior surface layer 105. Suitable etchants will uniformly dissolve the interior surface layer 105. Specifically, the glass container 100 is generally formed from a glass composition which includes silica ($SiO_2$) as the primary network former and additional constituent components (e.g., $B_2O_3$, alkali oxides, alkaline earth oxides and the like) which are present in the silica network. However, the silica and the constituent components are not necessarily soluble in the same solutions or dissolve at the same rate in a solution. Accordingly, the etchant solution may contain one or more acids to facilitate a uniform dissolution of the glass network and additional constituent components contained in the interior surface layer 105.

For example, hydrofluoric acid (HF) may be utilized to dissolve the silica network as the fluorine chemistry attacks the Si—O—Si bonds of silica. The remaining constituent components (i.e., the constituents other than silica) may not be readily soluble in HF and, as a result, may remain as deposits on the interior of the glass container. These deposits may appear as surface features under microscopic examination and, because the network around the deposits has been dissolved, the deposits may be only weakly adhered to the interior of the glass container and, as such, pose a contamination risk. To remove these remaining constituent components from the interior surface, the etchant may further include one or more mineral acids which dissolve the remaining constituent components thereby facilitating a uniform dissolution of the glass network and additional constituent components and leaving behind a smooth, feature-free modified interior surface on the interior of the glass container.

In general, the etchant includes at least 0.1 Molar HF for dissolving the silica network and at least one mineral acid for dissolving the other constituent components present in the glass network. An example of a suitable etchant includes, without limitation, 1.5 Molar hydrofluoric acid and 3 Molar hydrochloric acid (HCl). Such an etchant may dissolve typical Type IB pharmaceutical glass at a rate of approximately 1 μm per four minutes (i.e., 0.25 μm/min). One micron of depth generally corresponds to about 0.24 mg/cm² of glass dissolved. The dissolution rate of the glass in the etchant is approximately linear with time (i.e., congruent dissolution) which allows for precise control of the depth of layer removed with the etchant. For example, a 12 minute treatment in the aforementioned HF—HCl solution will result in the removal of a layer of glass having an approximate thickness of 3 μm. In the embodiments described herein, the etchant is allowed to remain in the interior of the container for a time period sufficient to remove the interior surface layer 105 and the persistent layer heterogeneity, thereby improving the resistance of the glass container to delamination. In some embodiments, the etchant remains in the interior volume of the glass container for a period of time sufficient to remove a layer of glass having a thickness of at least 1 μm or even a thickness of at least 1.5 μm which is generally sufficient to remove the persistent layer heterogeneity. In some embodiments, the etchant remains in the interior volume of the glass container for a period of time sufficient to remove a layer of glass at least 3 μm thick.

In the embodiments described herein, it should be understood that processing conditions may affect the etch rate of glass in the etchant and may be adjusted to control the rate of dissolution of the glass. For example, the temperature of the etchant and/or glass vial may be increased to increase the etch rate of the glass in the etchant, thereby decreasing processing time. Alternatively, the concentration of the etchant may be increased to increase the etch rate of the glass in the etchant, thereby decreasing processing time.

While a specific etchant solution has been described herein, it should be understood that other etchants are contemplated for removing the persistent layer heterogeneity from the interior of the glass container. For example, the etchant may include other mineral acids such as sulfuric acid, nitric acid, hydrochloric acid, hydrofluoric acid, hydrobromic acid, and phosphoric acid and/or various combinations thereof. In one embodiment, the acid solution may include a mixture of 1.5 M hydrofluoric acid with 0.9 M sulfuric acid. These acid solutions effectively remove the thin skin layer of volatized and re-deposited organic solution without leaving a depleted "leach layer" on the inner surface of the glass container. Other suitable etchants may include, without limitation, the etching treatments disclosed in U.S. Pat. No. 2,106,744, U.S. Patent Publication No. 2011/0165393, U.S. Patent Publication No. 2013/0122306, and U.S. Patent Publication No. 2012/0282449 may also be used to etch at least the interior surface of the glass container.

In certain cases, the etchant may contain compounds known to promote chelation. Chelating agents are added to assist in reducing the activity of metals dissolved in solution. The term "metals" refers to glassy components (Si, Al, B, Na, K, Mg, Ca, Sr, Ba, Fe, Ti, Zr, etc.) which are dissolved by the etchant. By reducing the activity/concentration of metals in the etchant, the etchant more uniformly dissolves the glass surface and promotes the formation of a uniform glass surface chemistry. Said differently, chelating agents may be added to limit incongruent dissolution which creates compositional heterogeneities in depth due to preferential etching.

Similarly, LeChatelier's principal can also be used to precipitate metal species from the etchant. Different from chelating agents, reactive anions (or functional groups) can be added to the etchant to force precipitation of metal species from the etchant and maintain a low metal concentration in the etchant. When metal concentration is sufficiently low, the etching solution promotes formation of a uniform glass surface chemistry.

Some heterogeneities in surface composition are related to surface deposits of organic and inorganic particulate matter. Surfactants can be added to the etchant solution to promote rinsing/removal of these particles and heterogeneities from the glass surface as part of the etching process. With proper choice of surfactants, heterogeneities and particle concentrations can be reduced and aid in formation of a uniform surface chemistry.

After the etching treatment has removed the persistent layer heterogeneity from the interior surface of the glass container, the container is washed and dried after which there are no visibly perceptible signs of the etching treatment. Moreover, after the etching treatment, the modified interior surface of the glass container is smooth and free from topographical variations, such as pits and/or peaks, including those topographical variations caused by the presence of deposits of undissolved glass constituents. As used herein, the modified interior surface of the glass container is considered to be "free from topographical variations" when the average peak-to-valley roughness per 10,000 μm² of surface area is less than 1 μm. In some embodiments, the modified interior surface of the glass container is considered to be "free from topographical variations" when the average peak-to-valley roughness per 10,000 µm² of surface area is less than 100 nm. In some other embodiments, the modified interior surface of the glass container is considered to be "free from topographical variations" when the average peak-to-valley roughness per 10,000 µm² of surface area is less than 50 nm. The absence of topographical variations from the glass container following removal of the interior surface layer with the persistent layer heterogeneity may subsequently assist with a qualitative assessment of the presence (or absence) of delamination following exposure to a solution. For example, one qualitative technique to assess delamination is to examine the surface topology of the glass container following exposure to a solution. If the interior surface is initially smooth and, thereafter, appears pitted following exposure to a solution, delamination may have occurred. However, it may be difficult to make such a qualitative assessment unless the glass container is initially substantially free from topographical variations.

While the etchant is described hereinabove as being introduced into the interior volume of the glass container, it should be understood that other embodiments are possible. For example, the glass container may be completely submerged in the etchant such that the glass is in direct contact with both the interior surface of the glass container and the exterior surface of the glass container. This allows for a layer of glass to be simultaneously removed from the exterior surface of the glass container which can improve the mechanical properties of the glass container. Specifically, flaws, such as scratches, chips or the like, may be introduced into the exterior of the glass container in its as formed condition. Such flaws may be the result of mechanically handling of the containers by processing equipment or the like. These flaws may act as "stress risers" and serve as crack initiation sites, effectively reducing the strength of the glass container. In this embodiment, the exterior surface of the glass container is etched to a depth greater than a depth of the surface flaws present in the exterior surface of the wall portion of the glass container. Etching the external surface of the glass container allows for these flaws to be removed by removing the layer of glass containing the flaws, thereby reducing the susceptibility of the glass container to failure due to existing flaws. In addition, etching the external surface of the glass container may improve the adherence of coatings subsequently applied to the external surface including, without limitation, organic and inorganic coatings.

Figure 3:
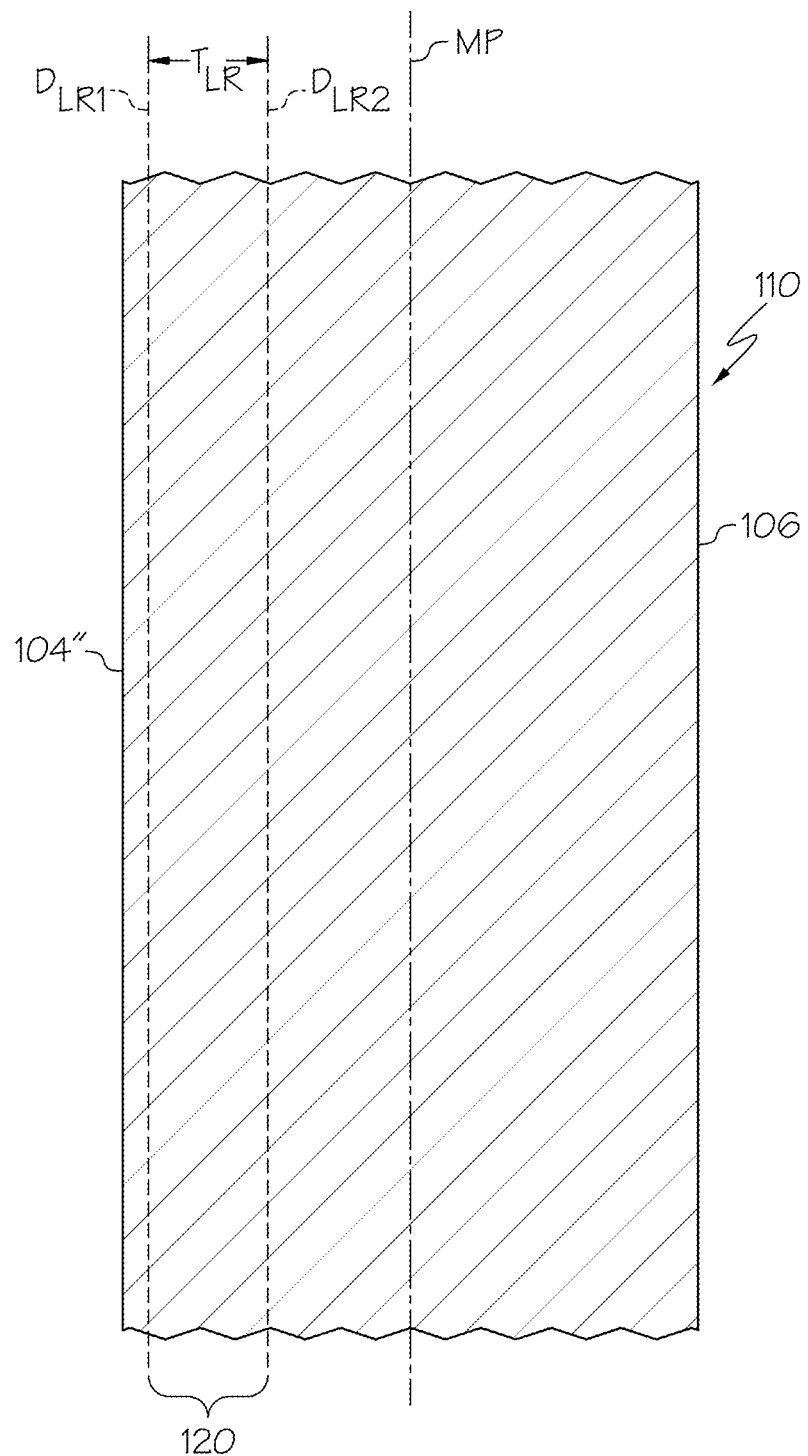
FIG. 3 schematically depicts a portion of the sidewall of the glass container of FIG. 1 after removal of the interior surface layer with persistent layer heterogeneity.

Referring now to FIGS. 1 and 3, after the interior surface layer 105 is removed from the glass container, the glass container has a homogenous composition through the thickness of the glass body 102 in each of the wall, heel, and floor portions. Specifically, FIG. 3 schematically depicts a partial cross section of a wall portion 110 of the glass container 100. The glass body 102 of the glass container 100 has an interior region 120 which extends from about 10 nm below the modified interior surface 104" of the glass container 100 (indicated in FIG. 3 as $D_{LR1}$) into the thickness of the wall portion 110 to a depth $D_{LR2}$ from the modified interior surface 104" of the glass container. The interior region extending from about 10 nm below the modified interior surface 104" is differentiated from the composition in the initial 5-10 nm below the surface due to experimental artifacts. At the start of a DSIMS analysis, the initial 5-10 nm is not included in the analysis because of three concerns: variable sputtering rate of ions from the surface as a result of adventitious carbon, establishment of a steady state charge in part due to the variable sputtering rate, and mixing of species while establishing a steady state sputtering condition. Accordingly, it should be understood that the interior region 120 has a thickness $T_{LR}$ which is equal to $D_{LR2}-D_{LR1}$. The glass composition within the interior region has a persistent layer homogeneity which, in conjunction with the thickness $T_{LR}$ of the interior region, is sufficient to prevent delamination of the glass body following long term exposure to a solution contained in the interior volume 108 of the glass container 100. In some embodiments, the thickness $T_{LR}$ is at least about 100 nm. In some embodiments, the thickness $T_{LR}$ is at least about 150 nm. In some other embodiments, the thickness $T_{LR}$ is at least about 200 nm or even about 250 nm. In some other embodiments, the thickness $T_{LR}$ is at least about 300 nm or even about 350 nm. In yet other embodiments, the thickness $T_{LR}$ is at least about 500 nm. In some embodiments, the interior region 120 may extend to a thickness $T_{LR}$ of at least about 1 µm or even at least about 2 µm.

While the interior region 120 is described herein above as extending from 10 nm below the modified interior surface 104" of the glass container 100 into the thickness of the wall portion 110 to a depth $D_{LR2}$ from the modified interior surface 104" of the glass container 100, it should be understood that other embodiments are possible. For example, it is hypothesized that, despite the experimental artifacts noted above, the interior region with the persistent layer homogeneity may actually extend from the modified interior surface 104" of the glass container 100 into the thickness of the wall portion. Accordingly, in some embodiments, the thickness $T_{LR}$ may extend from the interior surface to the depth $D_{LR2}$. In these embodiments, the thickness $T_{LR}$ may be at least about 100 nm. In some embodiments, the thickness $T_{LR}$ is at least about 150 nm. In some other embodiments, the thickness $T_{LR}$ is at least about 200 nm or even about 250 nm. In some other embodiments, the thickness $T_{LR}$ is at least about 300 nm or even about 350 nm. In yet other embodiments, the thickness $T_{LR}$ is at least about 500 nm. In some embodiments, the interior region 120 may extend to a thickness $T_{LR}$ of at least about 1 µm or even at least about 2 µm.

In the embodiments described herein, the phrase "persistent layer homogeneity" means that the concentration of the constituent components (e.g., $SiO_2$, $Al_2O_3$, $Na_2O$, etc.) of the glass composition in the interior region do not vary from the concentration of the same constituent components at the midpoint of a thickness of the glass body (i.e., at a point along the midpoint line MP which evenly bisects the glass body between the modified interior surface 104" and the exterior surface 106) by an amount which would result in delamination of the glass body upon long term exposure to a solution contained within the glass container. In the embodiments described herein, the persistent layer homogeneity in the interior region of the glass body is such that an extrema (i.e., the minimum or maximum) of a layer concentration of each of the constituent components of the glass composition in the interior region 120 is greater than or equal to about 80% and less than or equal to about 120% of the same constituent component at a midpoint of a thickness of the glass body after the interior surface layer with the persistent layer heterogeneity has been removed from the glass container. In other embodiments, the persistent layer homogeneity in the interior region of the glass body is such that the extrema of the layer concentration of each of the constituent components of the glass composition in the interior region 120 is greater than or equal to about 90% and less than or equal to about 110% of the same constituent component at the midpoint of the thickness of the glass body after the interior surface layer with the persistent layer heterogeneity has been removed from the glass container. In still other embodiments, the persistent layer homogeneity in the interior region of the glass body is such that the extrema of the layer concentration of each of the constituent components of the glass composition in the interior region 120 is greater than or equal to about 92% and less than or equal to about 108% of the same constituent component at the midpoint of the thickness of the glass body after the interior surface layer with the persistent layer heterogeneity has been removed from the glass container. In some embodiments, the persistent layer homogeneity is exclusive of constituent components of the glass composition which are present in an amount less than about 2 mol.%. The persistent layer homogeneity is also exclusive of any water which may be present in the glass composition.

Removing the interior surface layer with the persistent layer heterogeneity such that the modified interior surface of the glass container has a persistent layer homogeneity, as described above, generally improves the resistance of the glass container to delamination. Specifically, providing the glass container with an interior region which is homogenous in composition (i.e., the extrema of the concentration of the constituent components in the interior region is within +/−20% of the same constituent components at the midpoint of the thickness of the glass body) removes the localized concentration of constituent components of the glass composition which may be susceptible to leaching which, in turn, mitigates the loss of glass particles from the interior surface of the glass container in the event that these constituent components are leached from the glass surface.

After the interior surface layer with the persistent layer heterogeneity is removed, the glass container includes a substantially unitary composition which extends from the interior surface of the body to a depth of at least 250 nm or even at least 300 nm. The term "unitary composition" refers to the fact that the glass from which the portion of the body extending from the modified interior surface into the thickness of the body to a depth of at least 250 nm or even at least than 300 nm is a single composition of material as compared to a coating material applied to another material of either the same or different composition. For example, in some embodiments, the body of the container may be constructed from a single glass composition. In another embodiment, the body of the container may be constructed from a laminated glass such that the interior surface of the body has a unitary composition which extends from the interior surface to a depth of at least 250 nm or even at least 300 nm. The glass container may include an interior region which extends from either the modified interior surface or from 10 nm below the modified interior surface to a depth of at least 100 nm, as noted above. This interior region may have a persistent layer homogeneity.

Figure 4:
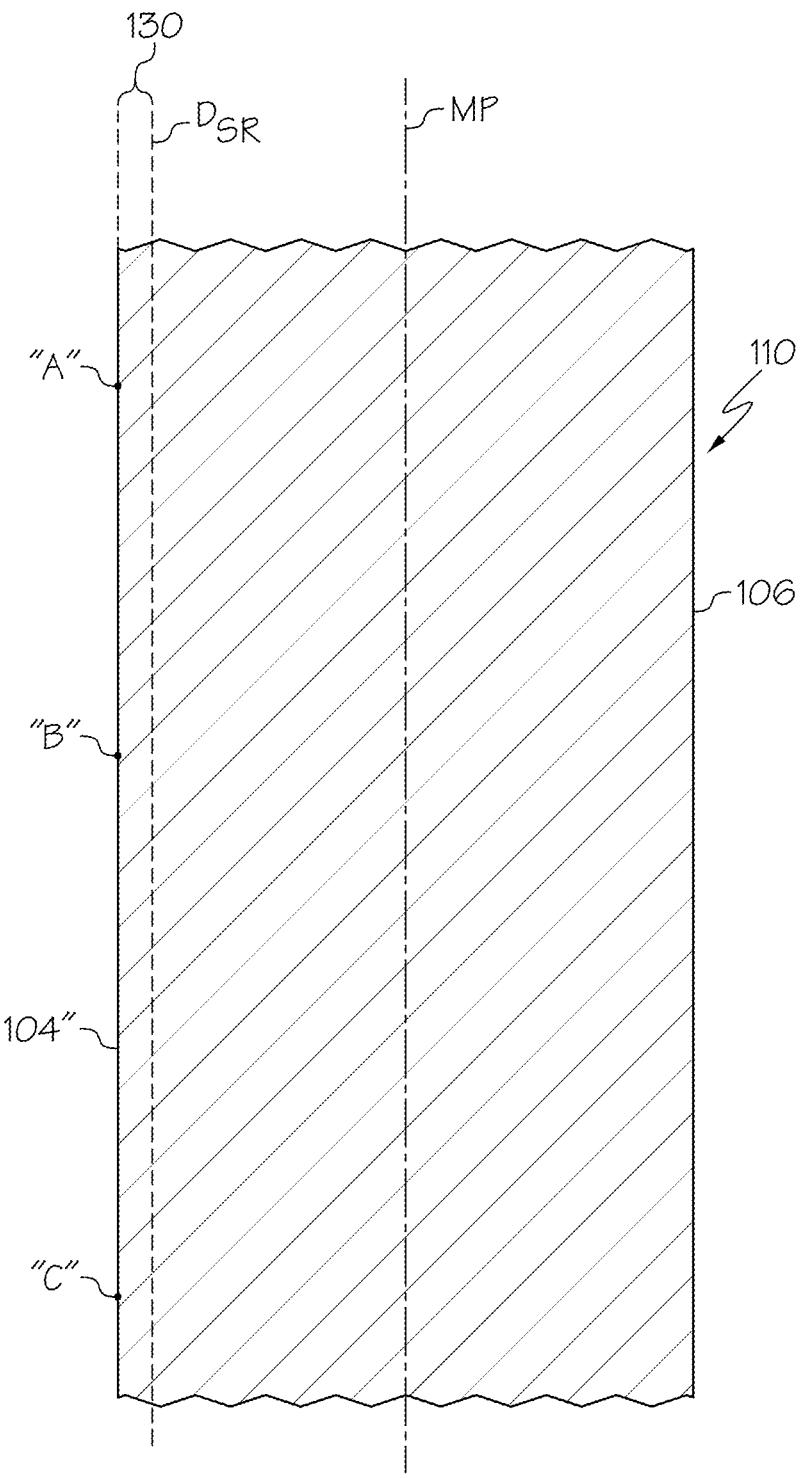
FIG. 4 schematically depicts portion of the sidewall of the glass container of FIG. 1 after removal of the interior surface layer with persistent layer heterogeneity.

Referring now to FIGS. 1 and 4, the glass containers described herein may also have a homogenous surface composition over the modified interior surface 104" of the glass body 102, including in the wall, heel, and floor portions, after the interior surface layer with the persistent surface heterogeneity is removed. FIG. 4 schematically depicts a partial cross section of a wall portion 110 of the glass container 100. The glass container 100 has a surface region 130 which extends over the entire interior surface of the glass container. The surface region 130 has a depth $D_{SR}$ which extends from the modified interior surface 104" of the glass container 100 into a thickness of the glass body towards the exterior surface 106. Accordingly, it should be understood that the surface region 130 has a thickness $T_{SR}$ which is equal to the depth $D_{SR}$. In some embodiments, the surface region extends to a depth $D_{SR}$ of at least about 10 nm from the modified interior surface 104" of the glass container 100. In some other embodiments, the surface region 130 may extend to a depth $D_{SR}$ of at least about 50 nm. In some other embodiments, the surface region 130 may extend to a depth $D_{SR}$ from about 10 nm to about 50 nm. Accordingly, it should be understood that the surface region 130 extends to a shallower depth than the interior region 120. The glass composition of the surface region has a persistent surface homogeneity which, in conjunction with the depth $D_{SR}$ of the interior region, is sufficient to prevent delamination of the glass body following long term exposure to a solution contained in the interior volume of the glass container.

In the embodiments described herein, the phrase "persistent surface homogeneity" means that the concentration of the constituent components (e.g., $SiO_2$, $Al_2O_3$, $Na_2O$, etc.) of the glass composition at a discrete point in the surface region do not vary from the concentration of the same constituent components at any second discrete point in the surface region by an amount which would result in delamination of the glass body upon long term exposure to a solution contained within the glass container. In the embodiments described herein, the persistent surface homogeneity in the surface region is such that, for a discrete point on the modified interior surface 104" of the glass container, the extrema (i.e., the minimum or maximum) of the surface concentration of each of the constituent components in the surface region 130 at a discrete point is greater than or equal to about 70% and less than or equal to about 130% of the same constituent components in the surface region 130 at any second discrete point on the modified interior surface 104" of the glass container 100 after the interior surface layer with the persistent layer heterogeneity has been removed from the glass container. For example, FIG. 3 depicts three discrete points (A, B, and C) on the modified interior surface 104" of the wall portion 110. Each point is separated from an adjacent point by at least about 3 mm. The extrema of the surface concentration of each of the constituent components in the surface region 130 at point "A" is greater than or equal to about 70% and less than or equal to about 130% of the same constituent components in the surface region 130 at points "B" and "C". When referring to the heel portion of the container, the discrete points may be approximately centered at the apex of the heel with adjacent points located at least 3 mm from the apex of the heel along the floor portion of the container and along the wall portion of the container, the distance between the points being limited by the radius of the vial and the height of the sidewall (i.e., the point where the sidewall transitions to the shoulder of the vial).

In some embodiments, the persistent surface homogeneity in the surface region is such that the extrema of the surface concentration of each of the constituent components of the glass composition in the surface region 130 for any discrete point on the modified interior surface 104" of the glass container 100 is greater than or equal to about 75% and less than or equal to about 125% of the same constituent component in the surface region 130 at any second discrete point on the modified interior surface 104" of the glass container 100 after the interior surface layer with the persistent layer heterogeneity has been removed from the glass container. In some other embodiments, the persistent surface homogeneity in the surface region is such that the extrema of the surface concentration of each of the constituent components of the glass composition in the surface region 130 for any discrete point on the modified interior surface 104" of the glass container 100 is greater than or equal to about 80% and less than or equal to about 120% of the same constituent component in the surface region 130 at any second discrete point on the modified interior surface 104" of the glass container 100 after the interior surface layer with the persistent layer heterogeneity has been removed from the glass container. In still other embodiments, the persistent surface homogeneity in the surface region is such that the extrema of the surface concentration of each of the constituent components of the glass composition in the surface region 130 for any discrete point on the modified interior surface 104" of the glass container 100 is greater than or equal to about 85% and less than or equal to about 115% of the same constituent component in the surface region 130 at any second discrete point on the interior surface 104 of the glass container 100 after the interior surface layer with the persistent layer heterogeneity has been removed from the glass container. In the embodiments described herein, the surface concentration of the constituent components of the glass composition in the surface region is measured by photoelectron spectroscopy. In some embodiments, the persistent surface homogeneity in the surface region is exclusive of constituent components of the glass composition which are present in an amount less than about 2 mol.%. The persistent surface homogeneity is also exclusive of any water which may be present in the glass composition.

The homogeneity of the surface concentration of the glass constituent components in the surface region 130 after the interior surface layer with the persistent layer heterogeneity has been removed from the glass container is generally an indication of the propensity of the glass composition to delaminate and shed glass particles from the modified interior surface 104" of the glass container 100. When the glass composition has a persistent surface homogeneity in the surface region 130 (i.e., when the extrema of the surface concentration of the glass constituent components in the surface region 130 at a discrete point on the interior surface 104 are within +1-30% of the same constituent components in the surface region 130 at any second discrete point on the interior surface 104), the glass composition has improved resistance to delamination.

It should now be understood that the glass containers described herein have a persistent layer homogeneity and/or a persistent surface homogeneity, each of which improves the resistance of the glass containers to delamination after the interior surface layer with the persistent layer heterogeneity has been removed from the glass container. The persistent layer homogeneity and/or the persistent surface homogeneity are present not only in the sidewall portions of the glass containers, but also in the heel and floor portions of the glass container such that the surfaces of the glass container bounding the interior volume are resistant to delamination.

As noted above, delamination may result in the release of silica-rich glass flakes into a solution contained within the glass container after extended exposure to the solution. Accordingly, the resistance to delamination may be characterized by the number of glass particulates present in a solution contained within the glass container after exposure to the solution under specific conditions. In order to assess the long-term resistance of the glass container to delamination, an accelerated delamination test was utilized. The test was performed on both ion-exchanged and non-ion-exchanged glass containers. The test consisted of washing the glass container at room temperature for 1 minute and depyrogenating the container at about 320° C. for 1 hour. Thereafter a solution of 20 mM glycine with a pH of 10 in water is placed in the glass container to 80-90% fill, the glass container is closed, and rapidly heated to 100° C. and then heated from 100° C. to 121° C. at a ramp rate of 1 deg/min at a pressure of 2 atmospheres. The glass container and solution are held at this temperature for 60 minutes, cooled to room temperature at a rate of 0.5 deg./min and the heating cycle and hold are repeated. The glass container is then heated to 50° C. and held for ten or more days for elevated temperature conditioning. After heating, the glass container is dropped from a distance of at least 18" onto a firm surface, such as a laminated tile floor, to dislodge any flakes or particles that are weakly adhered to the inner surface of the glass container. The distance of the drop may be scaled appropriately to prevent larger sized vials from fracturing on impact.

Thereafter, the solution contained in the glass container is analyzed to determine the number of glass particles present per liter of solution. Specifically, the solution from the glass container is directly poured onto the center of a Millipore Isopore Membrane filter (Millipore #ATTP02500 held in an assembly with parts #AP1002500 and #M000025A0) attached to vacuum suction to draw the solution through the filter within 10-15 seconds for 5 mL. Thereafter, another 5 mL of water was used as rinse to remove buffer residue from the filter media. Particulate flakes are then counted by differential interference contrast microscopy (DIC) in the reflection mode as described in "Differential interference contrast (DIC) microscopy and modulation contrast microscopy" from Fundamentals of light microscopy and digital imaging. New York: Wiley-Liss, pp 153-168. The field of view is set to approximately 1.5 mm×1.5 mm and particles larger than 50 µm are counted manually. There are 9 such measurements made in the center of each filter membrane in a 3×3 pattern with no overlap between images. If larger areas of the filter media are analyzed, results can be normalized to equivalent area (i.e., 20.25 $mm^2$). The images collected from the optical microscope are examined with an image analysis program (Media Cybernetic's ImagePro Plus version 6.1) to measure and count the number of glass flakes present. This was accomplished as follows: all of the features within the image that appeared darker than the background by simple grayscale segmentation were highlighted; the length, width, area, and perimeter of all of the highlighted features that have a length greater than 25 micrometers are then measured; any obviously non-glass particles are then removed from the data; the measurement data is then exported into a spreadsheet. Then, all of the features greater than 25 micrometers in length and brighter than the background are extracted and measured; the length, width, area, perimeter, and X-Y aspect ratio of all of the highlighted features that have a length greater than 25 micrometers are measured; any obviously non-glass particles are removed from the data; and the measurement data is appended to the previously exported data in the spreadsheet. The data within the spreadsheet is then sorted by feature length and broken into bins according to size. The reported results are for features greater than 50 micrometers in length. Each of these groups were then counted and the counts reported for each of the samples.

A minimum of 100 mL of solution is tested. As such, the solution from a plurality of small containers may be pooled to bring the total amount of solution to 100 mL. For containers having a volume greater than 10 mL, the test is repeated for a trial of 10 containers formed from the same glass composition under the same processing conditions and the result of the particle count is averaged for the 10 containers to determine an average particle count. Alternatively, in the case of small containers, the test is repeated for a trial of 10 vials, each of which is analyzed and the particle count averaged over the multiple trials to determine an average particle count per trial. Averaging the particle count over multiple containers accounts for potential variations in the delamination behavior of individual containers. Table 1 summarizes some non-limiting examples of sample volumes and numbers of containers for testing:

TABLE 1

Table of Exemplary Test Specimens

| Nominal Vial Capacity (mL) | Vial Max Volume (mL) | Minimum Solution per Vial (mL) | Number of Vials in a Trial | Number of Trials | Total Solution Tested (mL) |
| --- | --- | --- | --- | --- | --- |
| 2.0 | 4.0 | 3.2 | 10 | 4 | 128 |
| 3.5 | 7.0 | 5.6 | 10 | 2 | 112 |
| 4.0 | 6.0 | 4.8 | 10 | 3 | 144 |
| 5.0 | 10.0 | 8.0 | 10 | 2 | 160 |
| 6.0 | 10.0 | 8.0 | 10 | 2 | 160 |
| 8.0 | 11.5 | 9.2 | 10 | 2 | 184 |
| 10.0 | 13.5 | 10.8 | 10 | 1 | 108 |
| 20.0 | 26.0 | 20.8 | 10 | 1 | 208 |
| 30.0 | 37.5 | 30.0 | 10 | 1 | 300 |
| 50.0 | 63.0 | 50.4 | 10 | 1 | 504 |

It should be understood that the aforementioned test is used to identify particles which are shed from the interior wall(s) of the glass container due to delamination and not tramp particles present in the container from forming processes or particles which precipitate from the solution enclosed in the glass container as a result of reactions between the solution and the glass. Specifically, delamination particles may be differentiated from tramp glass particles based on the aspect ratio of the particle (i.e., the ratio of the maximum length of the particle to the thickness of the particle, or a ratio of the maximum and minimum dimensions). Delamination produces particulate flakes or lamellae which are irregularly shaped and typically have a maximum length greater than about 50 µm but often greater than about 200 µm. The thickness of the flakes is usually greater than about 100 nm and may be as large as about 1 µm. Thus, the minimum aspect ratio of the flakes is typically greater than about 50. The aspect ratio may be greater than about 100 and sometimes greater than about 1000. In contrast, tramp glass particles will generally have a low aspect ratio which is less than about 3. Accordingly, particles resulting from delamination may be differentiated from tramp particles based on aspect ratio during observation with the microscope. Other common non-glass particles include hairs, fibers, metal particles, plastic particles, and other contaminants and are thus excluded during inspection. Validation of the results can be accomplished by evaluating interior regions of the tested containers. Upon observation, evidence of skin corrosion/pitting/flake removal, as described in "Nondestructive Detection of Glass Vial Inner Surface Morphology with Differential Interference Contrast Microscopy" from Journal of Pharmaceutical Sciences 101(4), 2012, pages 1378-1384, is noted.

In the embodiments described herein, the number of particles present following accelerated delamination testing may be utilized to establish a delamination factor for the set of vials tested. In the embodiments described herein, trials of glass containers which average less than 10 glass particles with a minimum length of about 50 µm and an aspect ratio of greater than about 50 per trial following accelerated delamination testing are considered to have a delamination factor of 10. In the embodiments described herein, trials of glass containers which average less than 9 glass particles with a minimum length of about 50 µm and an aspect ratio of greater than about 50 per trial following accelerated delamination testing are considered to have a delamination factor of 9. In the embodiments described herein, trials of glass containers which average less than 8 glass particles with a minimum length of about 50 µm and an aspect ratio of greater than about 50 per trial following accelerated delamination testing are considered to have a delamination factor of 8. In the embodiments described herein, trials of glass containers which average less than 7 glass particles with a minimum length of about 50 µm and an aspect ratio of greater than about 50 per trial following accelerated delamination testing are considered to have a delamination factor of 7. In the embodiments described herein, trials of glass containers which average less than 6 glass particles with a minimum length of about 50 µm and an aspect ratio of greater than about 50 per trial following accelerated delamination testing are considered to have a delamination factor of 6. In the embodiments described herein, trials of glass containers which average less than 5 glass particles with a minimum length of about 50 µm and an aspect ratio of greater than about 50 per trial following accelerated delamination testing are considered to have a delamination factor of 5. In the embodiments described herein, trials of glass containers which average less than 4 glass particles with a minimum length of about 50 µm and an aspect ratio of greater than about 50 per trial following accelerated delamination testing are considered to have a delamination factor of 4. In the embodiments described herein, trials of glass containers which average less than 3 glass particles with a minimum length of about 50 µm and an aspect ratio of greater than about 50 per trial following accelerated delamination testing are considered to have a delamination factor of 3. In the embodiments described herein, trials of glass containers which average less than 2 glass particles with a minimum length of about 50 µm and an aspect ratio of greater than about 50 per trial following accelerated delamination testing are considered to have a delamination factor of 2. In the embodiments described herein, trials of glass containers which average less than 1 glass particle with a minimum length of about 50 µm and an aspect ratio of greater than about 50 per trial following accelerated delamination testing are considered to have a delamination factor of 1. In the embodiments described herein, trials of glass containers which have 0 glass particles with a minimum length of about 50 µm and an aspect ratio of greater than about 50 per trial following accelerated delamination testing are considered to have a delamination factor of 0. Accordingly, it should be understood that the lower the delamination factor, the better the resistance of the glass container to delamination. In the embodiments described herein, the glass containers have a delamination factor of 10 or lower (i.e., a delamination factor of 3, 2, 1 or 0) after the interior surface layer with the persistent layer heterogeneity has been removed from the glass container.

Glass containers having the characteristics described hereinabove (i.e., homogenous compositions over the interior surface and through the thickness as well as resistance to delamination) are obtained by removing the interior surface layer with the persistent layer heterogeneity from the glass container, as described herein. Specifically, the containers are initially formed from a Type IB glass composition such that the glass containers have an interior surface layer with a persistent layer heterogeneity extending in the interior surface of the glass container (i.e., the composition of the interior surface layer is different than the composition of the glass at the midpoint of the wall portion). The containers are initially formed by providing a glass stock material, such as glass tubing, glass sheet or the like, and shaping the glass stock material into a glass container using conventional shaping techniques such that at least the interior surface of the glass container has an interior surface layer with a persistent heterogeneity. Thereafter, the interior surface layer with the persistent layer heterogeneity is removed from the interior surface of the glass container, as described herein, such that the glass container has a homogenous composition over the interior surface and through the thickness of the wall portion.

In the embodiments described herein, the glass containers may be formed from glass compositions which meet the criteria for Type I, Class A (Type IA) or Type I, Class B (Type IB) glasses under ASTM Standard E438-92 (2011) entitled "Standard Specification for Glasses in Laboratory Apparatus". Borosilicate glasses meet the Type I (A or B) criteria and are routinely used for pharmaceutical packaging. Examples of borosilicate glass include, without limitation, Corning® Pyrex® 7740, 7800, Wheaton 180, 200, and 400, Schott Duran®, Schott Fiolax®, KIMAX® N-51A, Gerresheimer GX-51 Flint and others.

In some embodiments described herein, the glass body 102 is strengthened, such as by ion-exchange strengthening or the like, after the interior surface layer with the persistent layer heterogeneity has been removed from the glass container. In embodiments, the glass body 102 may have a compressive stress of greater than or equal to about 250 MPa, 300 MPa or even greater than or equal to about 350 MPa at the surface of the glass. In embodiments, the compressive stress may be greater than or equal to about 400 MPa at the surface of the glass or even greater than or equal to about 450 MPa at the surface of the glass. In some embodiments, the compressive stress may be greater than or equal to about 500 MPa at the surface of the glass or even greater than or equal to about 550 MPa at the surface of the glass. In still other embodiments, the compressive stress may be greater than or equal to about 650 MPa at the surface of the glass or even greater than or equal to about 750 MPa at the surface of the glass. The compressive stress in the glass body 102 generally extends to a depth of layer (DOL) of at least about 10 µm. In some embodiments, the glass body 102 may have a depth of layer greater than about 25 µm or even greater than about 50 µm. In some other embodiments, the depth of the layer may be up to about 75 µm or even about 100 µm. The ion-exchange strengthening may be performed in a molten salt bath maintained at temperatures from about 350° C. to about 600° C. To achieve the desired compressive stress, the glass container in as-formed condition may be immersed in the salt bath for less than about 30 hours or even less than about 20 hours. In embodiments, the container may be immersed for less than about 15 hours or even for less than about 12 hours. In other embodiments, the container may be immersed for less than about 10 hours. For example, in one embodiment the glass container is immersed in a 100% $KNO_3$ salt bath at about 450° C. for about 5 hours to about 8 hours in order to achieve the desired depth of layer and compressive stress while maintaining the chemical durability of the glass composition.

The glass compositions from which the glass containers are formed are chemically durable and resistant to degradation, as determined by the ISO 720 standard, after the interior surface layer with the persistent layer heterogeneity has been removed from the glass container. The ISO 720 standard is a measure of the resistance of the glass to degradation in distilled water (i.e., the hydrolytic resistance of the glass). In brief, the ISO 720 standard protocol utilizes crushed grass grains which are placed in contact with 18 MΩ water under autoclave conditions (121° C., 2 atm) for 30 minutes. The solution is then titrated colorimetrically with dilute HCl to neutral pH. The amount of HCl required to titrate to a neutral solution is then converted to an equivalent of $Na_2O$ extracted from the glass and reported in µg of glass with smaller values indicative of greater durability. The ISO 720 entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; ISO 720:1985 entitled "Glass—Hydrolytic resistance of glass grains at 121 degrees C.—Method of test and classification"; and ISO 719:1985 "Glass—Hydrolytic resistance of glass grains at 98 degrees C.—Method of test and classification." Each standard and the classifications standard is broken into individual types. Type HGA1 is indicative of up to 62 µg extracted equivalent of $Na_2O$; Type HGA2 is indicative of more than 62 µg and up to 527 µg extracted equivalent of $Na_2O$; and Type HGA3 is indicative of more than 527 µg and up to 930 µg extracted equivalent of $Na_2O$. The glass containers described herein have an ISO 720 type HGA1 hydrolytic resistance after the interior surface layer with the persistent layer heterogeneity has been removed from the glass container.

The glass compositions from which the glass containers are formed are also chemically durable and resistant to degradation, as determined by the ISO 719 standard, after the interior surface layer with the persistent layer heterogeneity has been removed from the glass container. The ISO 719 standard is a measure of the resistance of the glass to degradation in distilled water (i.e., the hydrolytic resistance of the glass). In brief, the ISO 719 standard protocol utilizes crushed glass grains which are placed in contact with 18 MΩ water at a pressure of 2 atm and a temperature of 98° C. for 60 minutes. The solution is then titrated colorimetrically with dilute HCl to neutral pH. The amount of HCl required to titrate to a neutral solution is then converted to an equivalent of $Na_2O$ extracted from the glass and reported in µg of glass with smaller values indicative of greater durability. The ISO 719 standard is broken into individual types. Type HGB1 is indicative of up to 31 µg extracted equivalent of $Na_2O$; Type HGB2 is indicative of more than 31 µg and up to 62 µg extracted equivalent of $Na_2O$; Type HGB3 is indicative of more than 62 µg and up to 264 µg extracted equivalent of $Na_2O$; Type HGB4 is indicative of more than 264 µg and up to 620 µg extracted equivalent of $Na_2O$; and Type HGB5 is indicative of more than 620 µg and up to 1085 µg extracted equivalent of $Na_2O$. The glass containers described herein have an ISO 719 type HGB1 hydrolytic resistance after the interior surface layer with the persistent layer heterogeneity has been removed from the glass container.

With respect to the USP <660> test and/or the European Pharmacopeia 3.2.1 test, the glass containers described herein have a Type 1 chemical durability after the interior surface layer with the persistent layer heterogeneity has been removed from the glass container. As noted above, the USP <660> and European Pharmacopeia 3.2.1 tests are performed on intact glass containers rather than crushed grains of glass and, as such, the USP <660> and European Pharmacopeia 3.2.1 tests may be used to directly assess the chemical durability of the interior surface of the glass containers.

The glass compositions from which the glass containers are formed are also chemically durable and resistant to degradation in acidic solutions, as determined by the DIN 12116 standard, after the interior surface layer with the persistent layer heterogeneity has been removed from the glass container. In brief, the DIN 12116 standard utilizes a polished glass sample of a known surface area which is weighed and then positioned in contact with a proportional amount of boiling 6M hydrochloric acid for 6 hours. The sample is then removed from the solution, dried and weighed again. The glass mass lost during exposure to the acidic solution is a measure of the acid durability of the sample with smaller numbers indicative of greater durability. The results of the test are reported in units of half-mass per surface area, specifically $mg/dm^2$. The DIN 12116 standard is broken into individual classes. Class S1 indicates weight losses of up to 0.7 $mg/dm^2$; Class S2 indicates weight losses from 0.7 $mg/dm^2$ up to 1.5 mg/dm$^2$; Class S3 indicates weight losses from 1.5 mg/dm$^2$ up to 15 mg/dm$^2$; and Class S4 indicates weight losses of more than 15 mg/dm$^2$. The glass containers described herein have an DIN 12116 Class S2 acid resistance or better after the interior surface layer with the persistent layer heterogeneity has been removed from the glass container.

The glass compositions from which the glass containers are formed are also chemically durable and resistant to degradation in basic solutions, as determined by the ISO 695 standard, after the interior surface layer with the persistent layer heterogeneity has been removed from the glass container. In brief, the ISO 695 standard utilizes a polished glass sample which is weighed and then placed in a solution of boiling 1M NaOH+0.5M Na$_2$CO$_3$ for 3 hours. The sample is then removed from the solution, dried and weighed again. The glass mass lost during exposure to the basic solution is a measure of the base durability of the sample with smaller numbers indicative of greater durability. As with the DIN 12116 standard, the results of the ISO 695 standard are reported in units of mass per surface area, specifically mg/dm$^2$. The ISO 695 standard is broken into individual classes. Class A1 indicates weight losses of up to 75 mg/dm$^2$; Class A2 indicates weight losses from 75 mg/dm$^2$ up to 175 mg/dm$^2$; and Class A3 indicates weight losses of more than 175 mg/dm$^2$. The glass containers described herein have an ISO 695 base resistance of Class A2 or better after the interior surface layer with the persistent layer heterogeneity has been removed from the glass container.

It should be understood that, when referring to the above referenced classifications according to ISO 695, ISO 719, ISO 720 or DIN 12116, a glass composition or glass article which has a specified classification "or better" means that the performance of the glass composition is as good as or better than the specified classification. For example, a glass article which has an ISO 695 base resistance of "Class A2" or better may have an ISO 695 classification of either Class A2 or Class A1.

EXAMPLES

The embodiments of glass containers with improved resistance to delamination described herein will be further clarified by the following examples.

Example 1

The etch rate of glass containers formed from Type IB pharmaceutical borosilicate glass containers was determined. Two sets of five glass containers each (sets G1 & G2) formed from Type IB pharmaceutical borosilicate glass commercially available from Gerresheimer were tested. Specifically, the containers were 3 ml glass vials formed from Gerresheimer GX-51 Flint glass. Two sets of five glass containers each (sets S1 & S2) formed from Type IB pharmaceutical borosilicate glass and commercially available from Schott Glass were also tested. Specifically, the containers were 3 ml glass vials formed from Schott Fiolax® glass. Each container was initially weighed and the weight recorded. Sets G1 and S1 were filled with a solution of 0.5 Molar hydrofluoric acid and 0.9 molar hydrochloric acid. The solution was held in each of the containers for different amounts of time ranging from 1 minute to 12 minutes (i.e., 1 minute, 2 minutes, 4 minutes, 8 minutes and 12 minutes). Upon expiration of the time, the solution was emptied from each of the containers and the containers were rinsed, dried and weighed to determine the weight loss. The weight loss was then normalized to an estimated surface area.

Sets G2 and S2 were filled with a solution of 1.5 Molar hydrofluoric acid and 3.0 molar hydrochloric acid. The solution was held in each of the containers for different amounts of time ranging from 1 minute to 12 minutes (i.e., 1 minute, 2 minutes, 4 minutes, 8 minutes and 12 minutes). Upon expiration of the time, the solution was emptied from each of the containers and the containers were rinsed, dried and weighed to determine the weight loss. The weight loss was then normalized to an estimated surface area.

Figure 5:
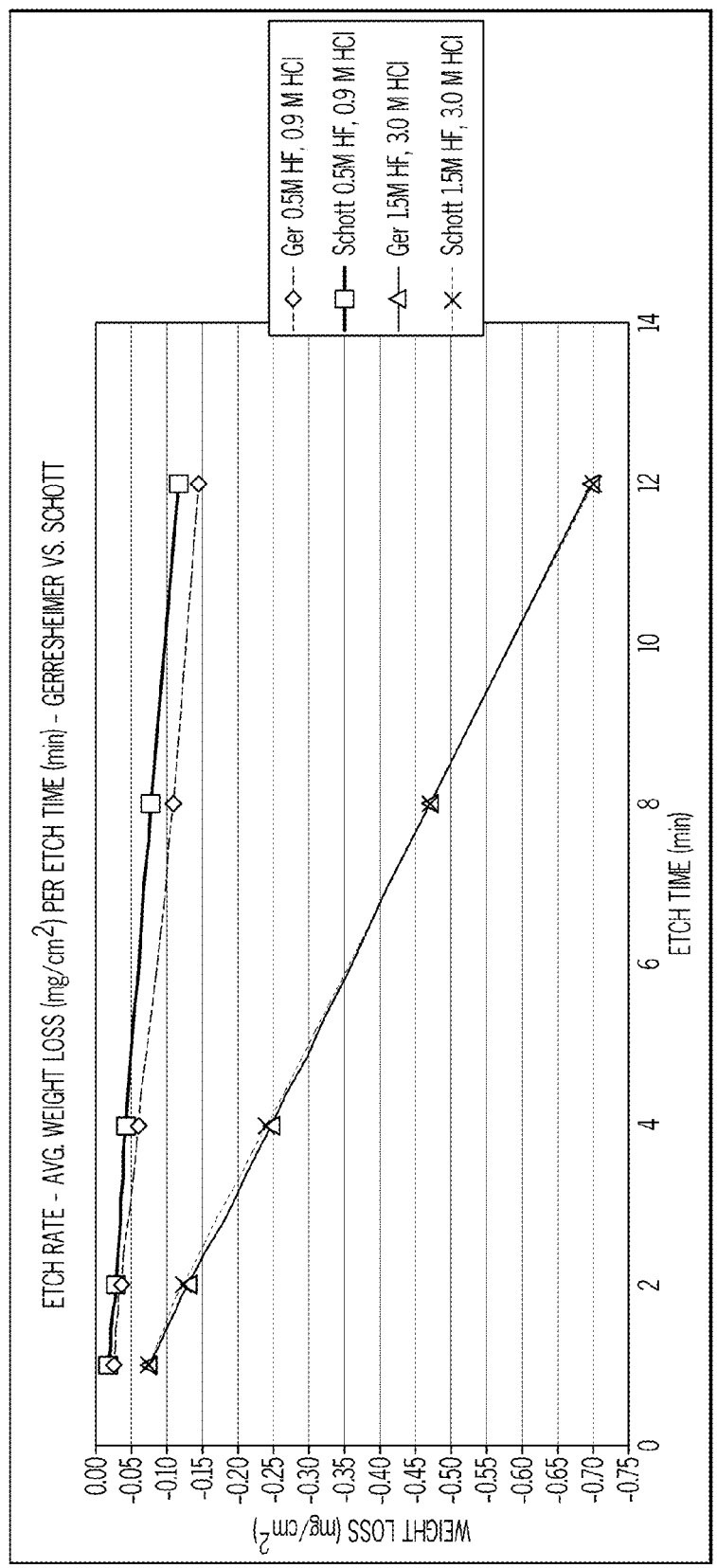
FIG. 5 graphically depicts the weight loss (y-axis) as a function of etch time (x-axis) for glass containers formed from different Type IB glass and etched with different etchants.

The weight loss (mg/cm$^2$) as a function of etch time (minutes) is graphically depicted in FIG. 5. As shown in FIG. 5, the weight loss becomes more negative (i.e., more weight is lost) with greater exposure time to the etchant. FIG. 5 also shows that the rate of weight loss increases with when the concentration of the etchant is increased, demonstrating that the amount of material removed from the interior surface of the glass can be controlled through either the time of exposure and/or the concentration of the etchant.

Example 2

Figure 6A:
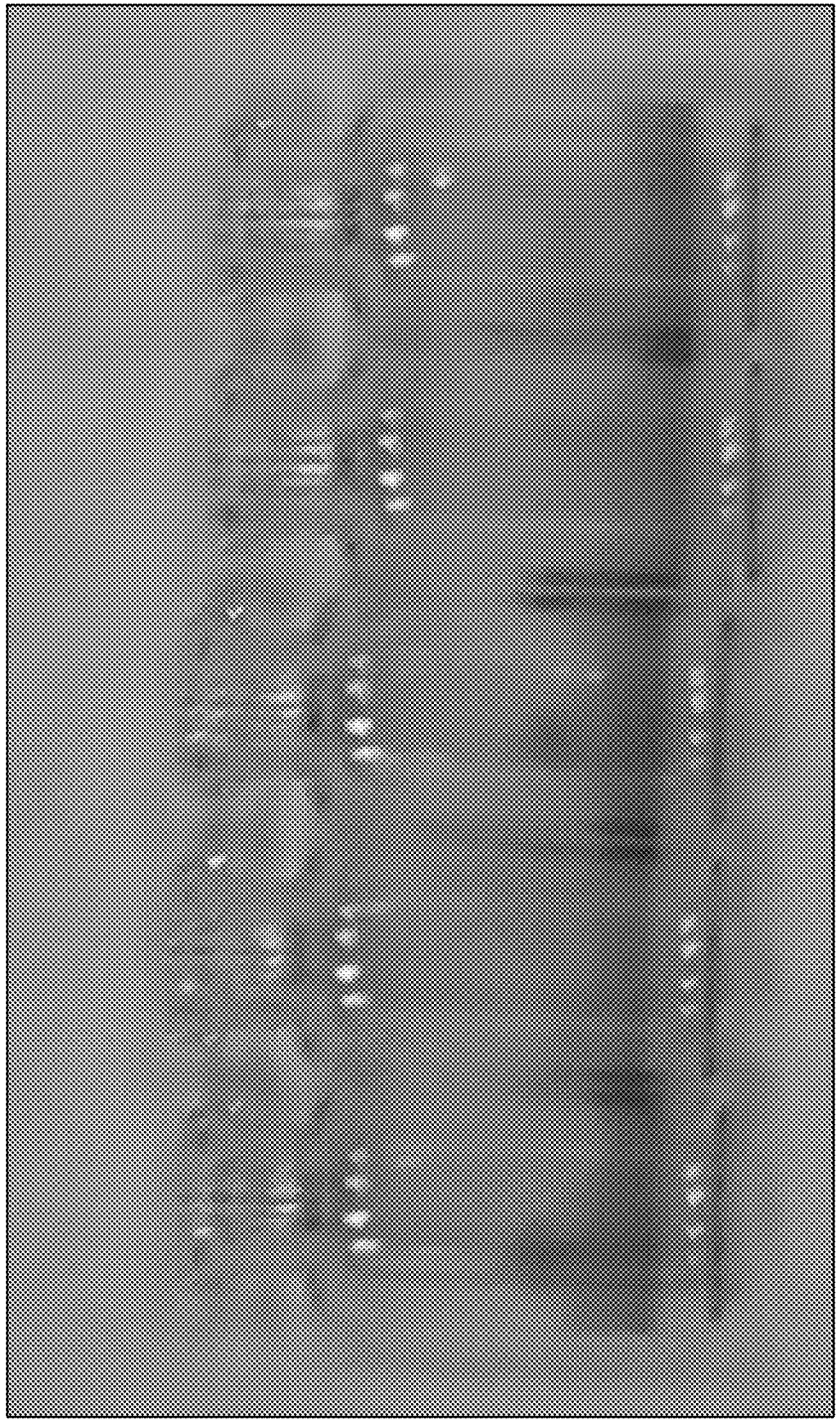
FIG. 6A is a photograph of glass vials with staining indicating the presence of an interior surface layer with a persistent layer heterogeneity.

Two sets of containers were tested to assess the efficacy of an etchant in removing the interior surface layer with a persistent layer heterogeneity from the interior of the containers. The containers were formed from Type IB pharmaceutical borosilicate glass. The glass containers tested were 3 ml glass vials formed from Gerresheimer GX-51 Flint glass (the "G" samples) and 3 ml glass vials formed from Schott Fiolax® glass (the "S" samples). A first set of five containers (a mix of G and S samples) was tested to determine the presence of an interior surface layer with a persistent layer heterogeneity. Specifically, a solution of 1% methylene blue dye in water was introduced into the interior volume of each container of the set for 1 minute. The containers were then emptied and rinsed with water. Each container in the set was visually inspected for blue staining. Each container had a perceptible blue stain on the interior surface of the container indicating the presence of an interior surface layer with a persistent layer heterogeneity, specifically boron rich regions, as shown in FIG. 6A where the blue stain appears as a grey region near the bottom of each vial.

Figure 6B:
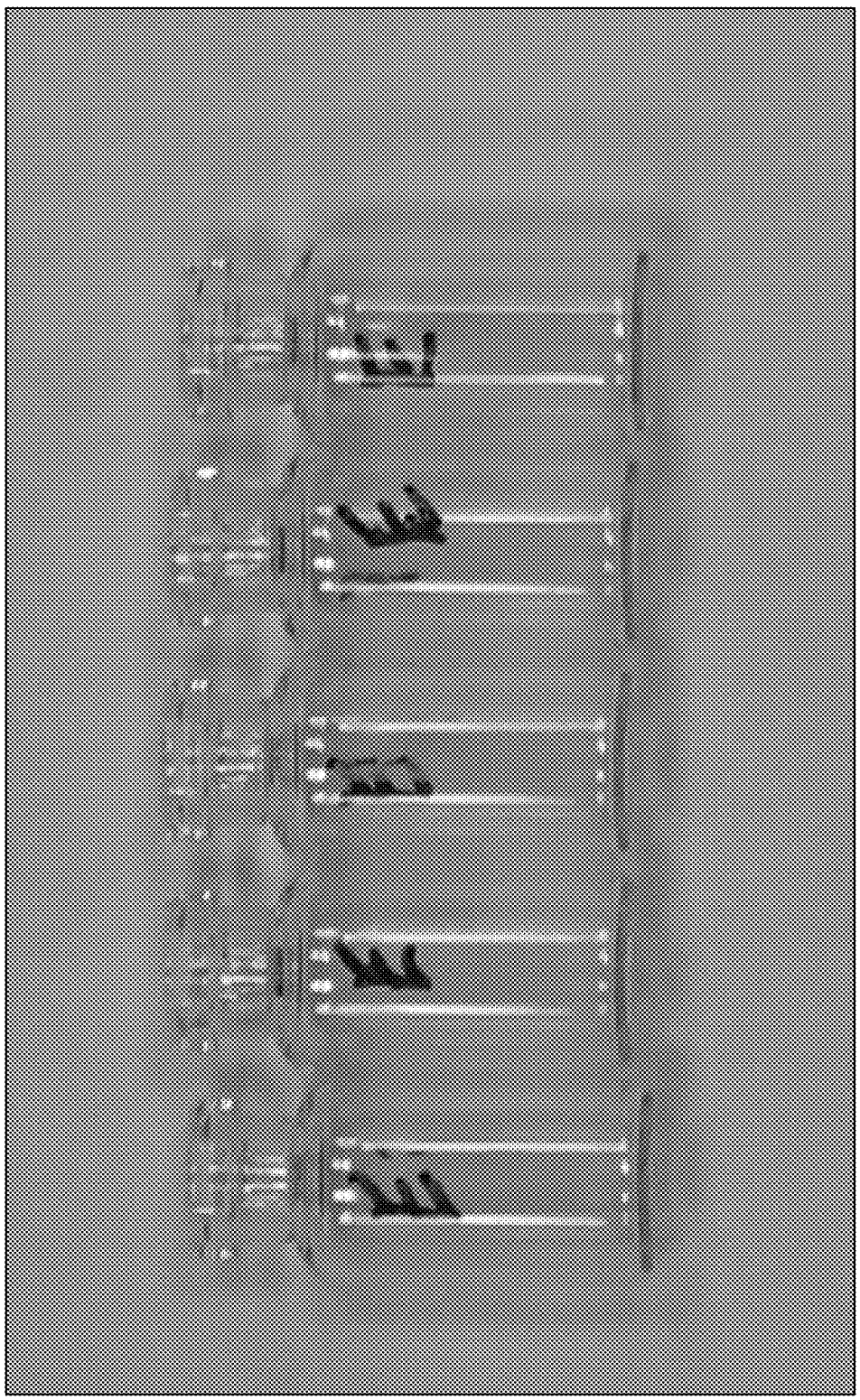
FIG. 6B is a photograph of glass vials following an etching treatment and methylene blue staining.

A second set of five containers identical to the first set was treated with an etchant comprising 1.5 Molar hydrofluoric acid and 3 Molar hydrochloric acid. The etchant was allowed to remain in the container for twelve minutes. The containers were then emptied, rinsed and dried. A solution of 1% methylene blue dye in water was then introduced into the interior volume of each container of the set for 1 minute. The containers were then emptied and rinsed with water. The containers following testing are shown in FIG. 6B. Each container in the set was visually inspected for blue staining. None of the containers exhibited staining, indicating that the etchant treatment completely removed the interior surface layer with a persistent layer heterogeneity.

Example 3

Glass containers were tested to determine the effect of removing the interior surface layer with a persistent layer heterogeneity on the hydrolytic resistance of the glass container. The containers were made from a Type IB pharmaceutical borosilicate glass. Specifically, the "G" containers were 3 ml glass vials formed from Gerresheimer GX-51 Flint glass. The "S" containers were 3 ml glass vials formed from Schott Fiolax® glass. The samples were tested according to Section 3.2.1 of the European Pharmcopoeia 7.0 entitled "Glass Containers For Pharmaceutical Use" (hereinafter the EP 3.2.1 test). Samples G1, S1-S3, $G_{not\ etched}$, S4, S5, G6, and G7 were tested in as formed condition. $G_{etched}$ was tested after being treated with an etchant comprising 1.5 Molar hydrofluoric acid and 3 Molar hydrochloric acid. The etchant was allowed to remain in the container for twelve minutes. The containers were then emptied, rinsed, dried and tested.

Table 2 reports the result of the EP 3.2.1 test. Specifically, the test results are reported in terms of the volume of 0.01 M HCl used per milliliter of solution to neutralize the alkali extracted from the container during testing. Accordingly, lower values of the HCl used indicate better hydrolytic resistance. As shown in Table 2, the unetched containers required from about 0.4 ml to about 1.14 ml of HCl to neutralize the extracted alkali. However, the etched container ($G_{etched}$) required only 0.1 ml of HCl to neutralize the extracted alkali, indicating a much lower amount of alkali present in the solution following etching and a significantly improved hydrolytic resistance relative to the un-etched containers.

TABLE 2

| Sample | HCl Used (ml 0.01M HCl per 100 ml) |
|---|---|
| G1 | 0.89 |
| S1 | 0.5 |
| S2 | 0.59 |
| S3 | 0.4 |
| $G_{etched}$ | 0.1 |
| $G_{not\ etched}$ | 1.09 |
| S4 | 0.59 |
| S5 | 0.59 |
| G6 | 1.14 |
| G7 | 1.14 |

The foregoing methods for forming a glass container may be understood according to a number of aspects.

A first aspect includes a method of forming a glass container may include forming a glass container comprising a sidewall at least partially enclosing an interior volume. At least a portion of the interior surface of the sidewall may have an interior surface layer with a persistent layer heterogeneity relative to a midpoint of the sidewall. The interior surface layer of the glass container may be removed from the interior surface of the sidewall such that a modified interior surface of the sidewall has an interior region extending from about 10 nm below the modified interior surface into a thickness of the sidewall. The interior region may have a persistent layer homogeneity relative to the midpoint of the sidewall such that the modified interior surface is resistant to delamination.

A second aspect includes, a method for forming a glass container may include forming a glass container comprising a sidewall at least partially enclosing an interior volume. At least a portion of the interior surface of the sidewall may have an interior surface layer with a persistent layer heterogeneity relative to a midpoint of the sidewall. The interior surface of the sidewall is etched to remove the interior surface layer such that a modified interior surface of the sidewall has an interior region extending from about 10 nm below the modified interior surface into a thickness of the sidewall. The interior region may have a persistent layer homogeneity relative to the midpoint of the sidewall such that the modified interior surface is resistant to delamination.

A third aspect includes, a method of forming a glass container includes forming a glass container comprising a sidewall at least partially enclosing an interior volume such that at least a portion of an interior surface of the sidewall has an interior surface layer. An extrema in a layer concentration of each constituent component in the interior surface layer is less than about 80% or greater than about 120% of a bulk concentration of a same constituent component at a midpoint of the sidewall when the glass container is in an as-formed condition. The interior surface layer is removed from the interior surface of the sidewall such that a modified interior surface of the sidewall has an interior region extending into a thickness of the sidewall. An extrema in a layer concentration of each constituent component in the interior region is greater than or equal to about 92% and less than or equal to about 108% of a bulk concentration of a same constituent component at a midpoint of the thickness of the sidewall after the interior surface layer has been removed.

A fourth aspect includes the method of any of the first through third aspects, further comprising removing an external surface layer from an external surface of the sidewall. The exterior surface may be etched to a depth greater than a depth of surface flaws present in the exterior surface of the sidewall.

A fifth aspect includes the method of any of the first through fourth aspects, wherein at least the interior surface of the glass container has a delamination factor of less than or equal to 10 after the interior surface layer is removed.

A sixth aspect includes the method of any of the first through fifth aspects, wherein the interior surface layer is removed from the interior surface of the sidewall with an etchant.

A seventh aspect includes the method of the sixth aspect, wherein the etchant comprises hydrofluoric acid and/or at least one mineral acid.

An eighth aspect includes the method of any of the first through seventh aspects, wherein the interior surface layer has a thickness greater than or equal to 10 nm or even greater than or equal to 30 nm.

A ninth aspect includes the method of any of the first and second aspects and fourth through eighth aspects, wherein an extrema in a layer concentration of each constituent component in the interior surface layer is less than about 80% or greater than about 120% of a bulk concentration of a same constituent component at a midpoint of the sidewall when the glass container is in an as-formed condition.

A tenth aspect includes the method of any of the first through ninth aspects, wherein the glass container is formed from a Type I, Class A or a Type I, Class B glass according to ASTM Standard E438-92.

An eleventh aspect includes the method of any of the first through tenth aspects, wherein the glass container is formed from a borosilicate glass.

A twelfth aspect includes the method of any of the first through eleventh aspects, wherein the interior surface layer is silica-poor.

A thirteenth aspect includes the method of any of the first and second aspects and fourth through twelfth aspects, wherein an extrema in a layer concentration of each constituent component in the interior region is greater than or equal to about 92% and less than or equal to about 108% of a bulk concentration of a same constituent component at a midpoint of the thickness of the sidewall after the interior surface layer has been removed.

A fourteenth aspect includes the method of any of the first through thirteenth aspects, wherein the modified interior surface of the sidewall comprises a surface region extending over the modified interior surface of the glass container to a depth from about 10 nm to about 50 nm from the interior surface of the glass container; and for a discrete point on the modified interior surface of the glass container, an extrema of a surface concentration of each constituent component of the glass in the surface region at the discrete point is greater than or equal to about 70% and less than or equal to about 130% of a same constituent component in the surface region at any second discrete point on the modified interior surface of the glass container after the persistent layer heterogeneity has been removed.

A fifteenth aspect includes the method of any of the first through fourteenth aspects, wherein the modified interior surface of the glass container is substantially free from topographical variations.

A sixteenth aspect includes the method of any of the first through fifteenth aspects, wherein the interior surface layer comprises a sodium borate rich glass material.

A seventeenth aspect includes the method of any of the first through sixteenth aspects, wherein tan average peak-to-valley roughness per 10,000 μm² of surface area of the modified interior surface is less than 1 μm.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of forming a glass container, the method comprising:
   forming a glass container comprising a sidewall at least partially enclosing an interior volume, at least a portion of an interior surface of the sidewall having an interior surface layer with a persistent layer heterogeneity relative to a midpoint of the sidewall; and
   removing the interior surface layer from the interior surface of the sidewall such that a modified interior surface of the sidewall has an interior region extending from about 10 nm below the modified interior surface into a thickness of the sidewall, the interior region having a persistent layer homogeneity relative to the midpoint of the sidewall such that the modified interior surface is resistant to delamination, wherein an extrema in a layer concentration of each constituent component in the interior region is greater than or equal to about 92% and less than or equal to about 108% of a bulk concentration of a same constituent component at a midpoint of the thickness of the sidewall after the interior surface layer has been removed.

2. The method of claim 1, further comprising removing an external surface layer from an external surface of the sidewall.

3. The method of claim 1, wherein the glass container has a delamination factor of less than or equal to 10 after the interior surface layer is removed.

4. The method of claim 1, wherein the interior surface layer is removed from the interior surface of the sidewall with an etchant comprising at least one hydrofluoric acid or at least one mineral acid.

5. The method of claim 1, wherein the interior surface layer has a thickness greater than or equal to 30 nm.

6. The method of claim 1, wherein an extrema in a layer concentration of each constituent component in the interior surface layer is less than about 80% or greater than about 120% of a bulk concentration of a same constituent component at a midpoint of the sidewall when the glass container is in an as-formed condition.

7. The method of claim 1, wherein the glass container is formed from a Type I, Class A or a Type I, Class B glass according to ASTM Standard E438-92.

8. The method of claim 1, wherein the glass container is formed from a borosilicate glass.

9. The method of claim 1, wherein the interior surface layer is silica-poor.

10. The method of claim 1, wherein the modified interior surface of the sidewall comprises a surface region extending over the modified interior surface of the glass container to a depth from about 10 nm to about 50 nm from the interior surface of the glass container; and
   for a discrete point on the modified interior surface of the glass container, an extrema of a surface concentration of each constituent component of the glass in the surface region at the discrete point is greater than or equal to about 70% and less than or equal to about 130% of a same constituent component in the surface region at any second discrete point on the modified interior surface of the glass container after the persistent layer heterogeneity has been removed.

11. The method of claim 1, wherein the modified interior surface of the glass container is substantially free from topographical variations.

12. A method for forming a glass container, the method comprising:
   forming a glass container comprising a sidewall at least partially enclosing an interior volume, at least a portion of an interior surface of the sidewall having an interior surface layer with a persistent layer heterogeneity relative to a midpoint of the sidewall; and
   etching the interior surface of the sidewall with an etchant to remove the interior surface layer such that a modified interior surface of the sidewall has an interior region extending from about 10 nm below the modified interior surface into a thickness of the sidewall, the interior region having a persistent layer homogeneity relative to the midpoint of the sidewall such that the modified interior surface is resistant to delamination, wherein an extrema in a layer concentration of each constituent component in the interior region is greater than or equal to about 92% and less than or equal to about 108% of a bulk concentration of a same constituent component at a midpoint of the thickness of the sidewall after the interior surface layer has been removed.

13. The method of claim 12, further comprising etching an exterior surface of the sidewall.

14. The method of claim 13, wherein the exterior surface is etched to a depth greater than a depth of surface flaws present in the exterior surface of the sidewall.

15. The method of claim 12, wherein the glass container has a delamination factor of less than or equal to 10 after the interior surface layer is removed.

16. The method of claim 12, wherein the etchant comprises hydrofluoric acid.

17. The method of claim 12, wherein the etchant comprises hydrochloric acid.

18. The method of claim 12, wherein the etchant comprises at least one mineral acid.

19. The method of claim 12, wherein the interior surface layer has a thickness greater than or equal to 10 nm.

20. The method of claim 12, wherein the glass container is formed from a Type I, Class A or a Type I, Class B glass according to ASTM Standard E438-92.

21. The method of claim 12, wherein the interior surface layer comprises a sodium borate rich glass material.

22. The method of claim 12, wherein an extrema in a layer concentration of each constituent component in the interior surface layer is less than about 80% or greater than about 120% of a bulk concentration of a same constituent component at a midpoint of the sidewall when the glass container is in an as-formed condition.

23. The method of claim 12, wherein the modified interior surface of the sidewall comprises a surface region extending over the modified interior surface of the glass container to a depth from about 10 nm to about 50 nm from the interior surface of the glass container; and for a discrete point on the modified interior surface of the glass container, an extrema of a surface concentration of each constituent component of the glass in the surface region at the discrete point is greater than or equal to about 70% and less than or equal to about 130% of a same constituent component in the surface region at any second discrete point on the modified interior surface of the glass container after the persistent layer heterogeneity has been removed.

24. The method of claim 12, wherein an average peak-to-valley roughness per 10,000 µm² of surface area of the modified interior surface is less than 1 µm.

25. A method of forming a glass container, the method comprising:

forming a glass container comprising a sidewall at least partially enclosing an interior volume such that at least a portion of an interior surface of the sidewall has an interior surface layer wherein an extrema in a layer concentration of each constituent component in the interior surface layer is less than about 80% or greater than about 120% of a bulk concentration of a same constituent component at a midpoint of the sidewall when the glass container is in an as-formed condition; and removing the interior surface layer from the interior surface of the sidewall such that a modified interior surface of the sidewall has an interior region extending into a thickness of the sidewall wherein an extrema in a layer concentration of each constituent component in the interior region is greater than or equal to about 92% and less than or equal to about 108% of a bulk concentration of a same constituent component at a midpoint of the thickness of the sidewall after the interior surface layer has been removed.

26. The method of claim 25, wherein at least the modified interior surface of the glass container has a delamination factor of less than or equal to 10 after the interior surface layer is removed.

27. The method of claim 25, wherein the glass container is formed from a Type I, Class A or a Type I, Class B glass according to ASTM Standard E438-92.

28. The method of claim 25, wherein an average peak-to-valley roughness per 10,000 µm² of surface area of the modified interior surface is less than 1 µm.

29. The method of claim 25, wherein the modified interior surface of the sidewall comprises a surface region extending over the modified interior surface of the glass container to a depth from about 10 nm to about 50 nm from the interior surface of the glass container; and for a discrete point on the modified interior surface of the glass container, an extrema of a surface concentration of each constituent component of the glass in the surface region at the discrete point is greater than or equal to about 70% and less than or equal to about 130% of a same constituent component in the surface region at any second discrete point on the modified interior surface of the glass container after the interior surface layer has been removed.

\* \* \* \* \*